(12) United States Patent
Luo et al.

(10) Patent No.: US 10,555,331 B2
(45) Date of Patent: Feb. 4, 2020

(54) NESTED SYSTEM OPERATION

(71) Applicant: QUALCOMM Incorporated, San Diego, CA (US)

(72) Inventors: Tao Luo, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 14/957,417

(22) Filed: Dec. 2, 2015

(65) Prior Publication Data

US 2016/0165622 A1 Jun. 9, 2016

Related U.S. Application Data

(60) Provisional application No. 62/104,629, filed on Jan. 16, 2015, provisional application No. 62/089,792, filed on Dec. 9, 2014.

(51) Int. Cl.
*H04W 72/12* (2009.01)
*H04L 5/00* (2006.01)
(Continued)

(52) U.S. Cl.
CPC ....... *H04W 72/1226* (2013.01); *H04L 1/0027* (2013.01); *H04L 1/0028* (2013.01); *H04L 5/0007* (2013.01); *H04L 5/0048* (2013.01); *H04L 5/0094* (2013.01); *H04W 72/044* (2013.01); *H04W 72/0446* (2013.01)

(58) Field of Classification Search
CPC combination set(s) only.
See application file for complete search history.

(56) References Cited

U.S. PATENT DOCUMENTS 7,406,058 B2 7/2008 Laroia et al.
9,438,366 B2 9/2016 Luo et al.
(Continued)

FOREIGN PATENT DOCUMENTS

CN 101309523 A 11/2008
JP 2014068121 A 4/2014
(Continued)

OTHER PUBLICATIONS

ISA/EPO, International Search Report and Written Opinion of the International Searching Authority, Int'l. App. No. PCT/US2015/063763, dated Feb. 15, 2016, European Patent Office, Rijswijk, NL, 12 pgs.
(Continued)

*Primary Examiner* — Vinncelas Louis
(74) *Attorney, Agent, or Firm* — Holland & Hart LLP

(57) ABSTRACT

Methods, systems, and devices are described for resource scheduling for different services in a wireless communications system. A base station or a user equipment (UE) operating within a wireless communication system may, for example, communicate using two or more different configurations of resource (e.g., symbol) duration, while maintaining a common tone spacing, bandwidth, transmission time interval (TTI) designation, or the like. For instance, an orthogonal frequency division multiplexing (OFDM) symbol may be subdivided or segmented, and each segment, which may include a cyclic prefix, may be utilized as a resource unit.

25 Claims, 16 Drawing Sheets

(51) Int. Cl.
*H04L 1/00* (2006.01)
*H04W 72/04* (2009.01)

(56) References Cited

U.S. PATENT DOCUMENTS

| | | | | |
|---|---|---|---|---|
| 9,532,243 | B2* | 12/2016 | Kim | H04W 24/02 |
| 2009/0245195 | A1* | 10/2009 | Bhattad | H04L 5/0053 |
| | | | | 370/329 |
| 2011/0007730 | A1 | 1/2011 | Han et al. | |
| 2011/0128909 | A1* | 6/2011 | Luo | H04L 5/0023 |
| | | | | 370/328 |
| 2011/0292865 | A1* | 12/2011 | Seo | H04B 7/15528 |
| | | | | 370/315 |
| 2012/0113816 | A1* | 5/2012 | Bhattad | H04L 5/0032 |
| | | | | 370/246 |
| 2012/0230270 | A1 | 9/2012 | Kim et al. | |
| 2012/0287882 | A1 | 11/2012 | Kim et al. | |
| 2013/0272229 | A1 | 10/2013 | Dinan | |
| 2014/0301305 | A1 | 10/2014 | Xu et al. | |
| 2014/0314418 | A1* | 10/2014 | Sun | H04B 10/27 |
| | | | | 398/89 |
| 2014/0369242 | A1* | 12/2014 | Ng | H04W 72/0453 |
| | | | | 370/280 |
| 2015/0180622 | A1 | 6/2015 | Yoo et al. | |
| 2016/0029331 | A1 | 1/2016 | Seo et al. | |

FOREIGN PATENT DOCUMENTS

| | | |
|---|---|---|
| JP | 2016517653 A | 6/2016 |
| WO | WO-2005020606 A1 | 3/2005 |
| WO | WO-2009120943 A2 | 10/2009 |
| WO | WO-2011054003 A1 | 5/2011 |
| WO | WO-2011103475 A1 | 8/2011 |
| WO | WO-2014142576 A1 | 9/2014 |

OTHER PUBLICATIONS

Alcatel-Lucent Shanghai Bell et al., "LBT Enhancements for Licensed-Assisted Access", 3GPP TSG RAN WG1 Meeting #79, R1-144701, San Francisco, USA, Nov. 17-21, 2014, 5 Pages.
Cisco Systems: "Candidate Detailed Solutions for DL Transmissions in Unlicensed Spectrum", 3GPP TSG RAN WG1 #79, R1-144604, Nov. 17-21, 2014, San Francisco, USA, pp. 1-3.
Huawei, et al., "Potential Solutions for LAA-LTE Design", 3GPP Draft; R1-143726, 3rd Generation Partnership Project (3GPP), Mobile Competence Centre, 650, Route Des Lucioles, F-06921 Sophia-Antipolis Cedex, France, vol. Ran WG1, No. Ljubljana, Slovenia; Oct. 6, 2014-Oct. 10, 2014, Sep. 27, 2014 (Sep. 27, 2014), 5 pages, XP050869412, Retrieved from the Internet: URL: http://www.3gpp.org/ftp/tsg_ran/WG1_RL1/TSGR1_78b/Docs/ [retrieved on Sep. 27, 2014].
Qualcomm et al., "Way Forward on Subframe Structure, Numerology and System Bandwidth for LAA", 3GPP TSG RAN WG1 #79, R1-145380, San Francisco, USA, Nov. 17-21, 2014, 3 Pages.
ZTE: "Frame Structure Design for LAA Considering LBT", 3GPP TSG RAN WG1 Meeting #79, R1-144828, San Francisco, USA, Nov. 17-21, 2014, pp. 1-5.

* cited by examiner

NESTED SYSTEM OPERATION

CROSS REFERENCES

The present application for patent claims priority to U.S. Provisional Patent Application No. 62/104,629 by Luo et al., entitled "NESTED SYSTEM OPERATION," filed Jan. 16, 2015, and U.S. Provisional Patent Application No. 62/089,792 by Luo et al., entitled "NESTED SYSTEM OPERATION," filed Dec. 9, 2014, assigned to the assignee hereof, and expressly incorporated by reference herein.

BACKGROUND

1. Field of the Disclosure

The present disclosure, relates to wireless communication systems, and more particularly to techniques for resource scheduling for different services in wireless communications systems.

2. Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

As technology advances, some more advanced mobile devices within a wireless communications network may have capabilities in which communications are transmitted according to different timing characteristics or transmissions have different control information relative to legacy mobile devices (e.g., devices operating according to prior industry standards) that operate within the network. Resources within the network may be used to provide services to the advanced mobile devices as well as the legacy mobile devices, or may be used to provide different types of services to advanced mobile devices. In certain situations, it may be desirable to provide flexibility in allocation of resources of a wireless communications network based on different mobile devices in order to support the advanced mobile devices as well as provide backward compatibility for legacy mobile devices.

SUMMARY

Systems, methods, and devices for resource scheduling and utilization in a wireless communications system are described. A base station or a user equipment (UE) operating within a wireless communication system may, for example, communicate using two or more different configurations of resource (e.g., symbol) duration, while maintaining a common tone spacing, bandwidth, transmission time interval (TTI) designation, or the like. For instance, an orthogonal frequency division multiplexing (OFDM) symbol may be subdivided or segmented, and each segment, which may include a cyclic prefix, may be utilized as a resource unit.

A method of communication at a wireless device is described. The method may include configuring a first resource segment having a first duration that is less than a symbol period, configuring a second resource segment having a second duration that is less than the symbol period, where a total duration of the first and second durations is less than or equal to the symbol period, and communicating utilizing the configured first and second resource segments.

An apparatus for communication at a wireless device is described. The apparatus may include means for configuring a first resource segment having a first duration that is less than a symbol period, means for configuring a second resource segment having a second duration that is less than the symbol period, where a total duration of the first and second durations is less than or equal to the symbol period, and means for communicating utilizing the configured first and second resource segments.

A further apparatus for communication at a wireless device is described. The apparatus may include a processor, memory in electronic communication with the processor, and instructions stored in the memory. The instructions may be executable by the processor to cause the apparatus to configure a first resource segment having a first duration that is less than a symbol period, configure a second resource segment having a second duration that is less than the symbol period, where a total duration of the first and second durations is less than or equal to the symbol period, and communicate utilizing the configured first and second resource segments.

A non-transitory computer-readable medium storing code for communication at a wireless device is described. The code may include instructions executable to configure a first resource segment having a first duration that is less than a symbol period, configure a second resource segment having a second duration that is less than the symbol period, where a total duration of the first and second durations is less than or equal to the symbol period, and communicate utilizing the configured first and second resource segments.

Some examples of the method, apparatuses, or non-transitory computer-readable medium described above may further include processes, features, means, or instructions for configuring a symbol having the symbol period, where communicating with the wireless device includes communicating utilizing the configured symbol the configured first and second resource segments. Additionally or alternatively, in some examples, communicating includes communicating utilizing the configured symbol and the configured first and second resource segments in a common subframe.

In some examples of the method, apparatuses, or non-transitory computer-readable medium described above, the first resource segment includes a first cyclic prefix (CP), and the second resource segment includes a second CP. In some examples, communicating includes transmitting a control or data signal in the first resource segment, the second resource segment, and a symbol having the symbol period. The control or data signal spans the first and second durations and the symbol period.

Some examples of the method, apparatuses, or non-transitory computer-readable medium described above may further include processes, features, means, or instructions for configuring a third resource segment having a third duration that is less than the symbol period, where a total duration of the first, second, and third durations is greater than the symbol period, and communicating utilizing the configured first, second, and third resource segments. Additionally or alternatively, in some examples, communicating includes transmitting a control or data signal in the first resource segment, the second resource segment, and the third resource segment, where the control or data signal spans the first, second, and third durations.

In some examples of the method, apparatuses, or non-transitory computer-readable medium described above, the first resource segment, the second resource segment, or a combination thereof includes a demodulation reference signal (DMRS). Additionally or alternatively, in some examples, a symbol includes a portion of the DMRS, the symbol having the symbol period, where the DMRS spans the first and second durations and the symbol period.

In some examples of the method, apparatuses, or non-transitory computer-readable medium described above, the first resource segment, the second resource segment, or combination thereof includes a cell-specific reference signals (CRS). Additionally or alternatively, in some examples, a symbol includes a portion of the CRS, the symbol having the symbol period, where the CRS spans the first and second durations and the symbol period.

The first and second resource segments may include frequency resources of a first component carrier, and some examples of the method, apparatuses, or non-transitory computer-readable medium described above may further include processes, features, means, or instructions for scheduling the frequency resources of the first component carrier utilizing frequency resources of a second component carrier. Additionally or alternatively, some examples, processes, features, means, or instructions for receiving feedback related to the first or second resource segments on the frequency resources of the second component carrier.

In some examples of the method, apparatuses, or non-transitory computer-readable medium described above, the first resource segment, the second resource segment, or combination thereof includes a channel state information (CSI) reference signal. Additionally or alternatively, in some examples, a symbol includes a portion of the CSI reference signal, the symbol having the symbol duration, and where the CSI reference signal spans the first and second durations and the symbol period.

A further method of communication at a wireless device is also described. The method may include identifying a first resource segment having a first duration that is less than a symbol period, identifying a second resource segment having a second duration that is less than the symbol period, where a total duration of the first and second durations is less than or equal to the symbol period, and communicating with a node utilizing the first and second resource segments.

A further apparatus for communication at a wireless device is also described. The apparatus may include means for identifying a first resource segment having a first duration that is less than a symbol period, means for identifying a second resource segment having a second duration that is less than the symbol period, where a total duration of the first and second durations is less than or equal to the symbol period, and means for communicating with a node utilizing the first and second resource segments.

A further apparatus for communication at a wireless device is also described. The apparatus may include a processor, memory in electronic communication with the processor, and instructions stored in the memory. The instructions may be executable by the processor to cause the apparatus to identify a first resource segment having a first duration that is less than a symbol period, identify a second resource segment having a second duration that is less than the symbol period, where a total duration of the first and second durations is less than or equal to the symbol period, and communicate with a node utilizing the first and second resource segments.

A further non-transitory computer-readable medium storing code for communication at a wireless device is also described. The code may include instructions executable to identify a first resource segment having a first duration that is less than a symbol period, identify a second resource segment having a second duration that is less than the symbol period, where a total duration of the first and second durations is less than or equal to the symbol period, and communicate with a node utilizing the first and second resource segments.

Some examples of the method, apparatuses, or non-transitory computer-readable medium described above may further include processes, features, means, or instructions for identifying a symbol having the symbol period, where communicating includes communicating utilizing the symbol and the first and second resource segments. Additionally or alternatively, in some examples, communicating with the node includes communicating utilizing the symbol and the first and second resource segments in a common subframe.

In some examples of the method, apparatuses, or non-transitory computer-readable medium described above, the first resource segment includes a first CP, and the second resource segment includes a second CP. Additionally or alternatively, in some examples, communicating with the node includes receiving a control or data signal in the first resource segment, the second resource segment, and a symbol having the symbol period, where the control or data signal spans the first and second durations and the symbol period.

Some examples of the method, apparatuses, or non-transitory computer-readable medium described above may further include processes, features, means, or instructions for identifying a third resource segment having a third duration that is less than the symbol period, where a total duration of the first, second, and third durations is greater than the symbol period, and communicating utilizing the first, second, and third resource segments. Additionally or alternatively, in some examples, communicating with the node includes receiving a control or data signal in the first resource segment, the second resource segment, and the third resource segments, where the control or data signal spans the first, second, and third durations.

In some examples of the method, apparatuses, or non-transitory computer-readable medium described above, the first resource segment, the second resource segment, or combination thereof includes a DMRS. Additionally or alternatively, in some examples a symbol includes a portion of the DMRS, the symbol having the symbol period, and the DMRS spans the first and second durations and the symbol period.

In some examples of the method, apparatuses, or non-transitory computer-readable medium described above, the first resource segment, the second resource segment, or combination thereof includes a CRS. Additionally or alternatively, in some examples, a symbol includes a portion of the CRS, the symbol having the symbol period, and the CRS spans the first and second durations and the symbol period.

In some examples of the method, apparatuses, or non-transitory computer-readable medium described above, the first resource segment, the second resource segment, or combination thereof includes a CSI reference signal. Additionally or alternatively, in some examples, a symbol includes a portion of the CSI reference signal, the symbol having the symbol period, and the CSI reference signal spans the first and second durations and the symbol period.

The first and second resource segments may include frequency resources of a first component carrier, and some examples of the method, apparatuses, or non-transitory computer-readable medium described above may further include processes, features, means, or instructions for receiving grants for the frequency resources of the first component carrier utilizing frequency resources of a second component carrier. Additionally or alternatively, some examples, processes, features, means, or instructions for transmitting feedback related to the first or second resource segments on the frequency resources of the second component carrier.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques are described for resource scheduling for different types of communications, and for supporting devices operating according to different versions of a communication standard. This may generally be described as nested system operation. In some examples, a base station and one or several user equipments (UEs) may be configured to operate within a wireless communication system using different configurations of resource (e.g., symbol) duration. Resources within a system may be configured to support communication—e.g., low latency requirements for certain devices—while maintaining compatibility with legacy devices—e.g., devices operating according to a prior version of a communications standard. In order to offer benefits to new devices, such as supporting low latency operations or an enhanced component carrier, resources may be configured to complement systems having well-defined tone spacing, symbol duration, bandwidth, transmission time interval (TTI), and the like. Physical resources configured according to one numerology may thus be nested within a system generally configured to operate according to a different numerology.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
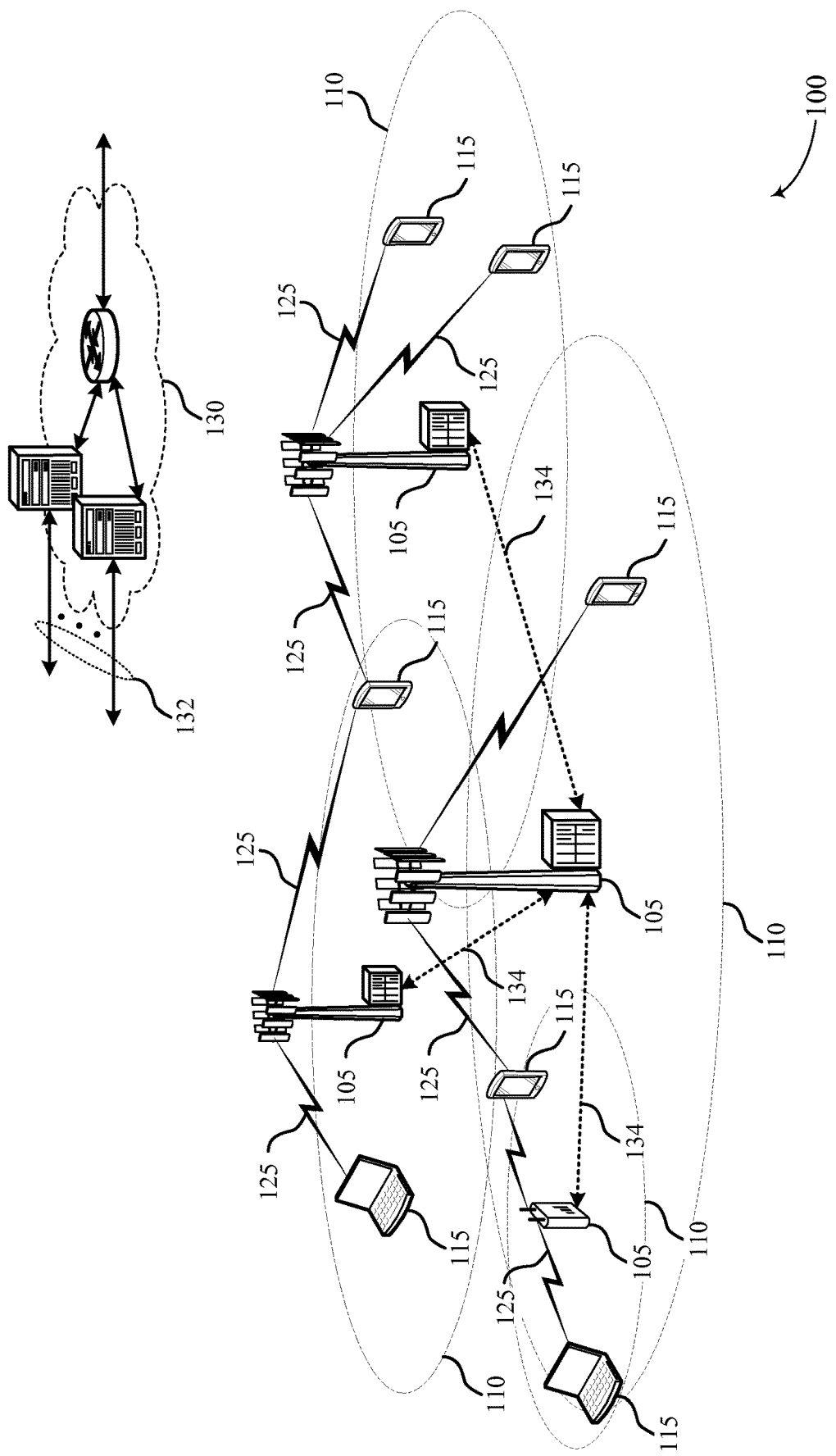
FIG. 1 illustrates an example of a wireless communications system that supports nested system operation in accordance with various aspects of the present disclosure.

Referring first to FIG. 1, a diagram illustrates an example of a wireless communications system 100, in accordance with an aspect of the present disclosure. The wireless communications system 100 includes a plurality of base stations (e.g., eNBs, or WLAN access points) 105, which may also be referred to as access points, a number of user equipment (UEs) 115, and a core network 130. Some of the base stations 105 may communicate with the UEs 115 under the control of a base station controller (not shown), which may be part of the core network 130 or the certain base stations 105 (e.g., eNBs or other access points) in various examples. Base stations 105 may communicate control information and/or user data with the core network 130 through backhaul links 132. In examples, the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UEs 115 via one or more access point antennas. Each of the base stations 105 sites may provide communication coverage for a respective coverage area 110. In some examples, base stations 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include base stations 105 of different types (e.g., macro, micro, and/or pico base stations). The base stations 105 may also utilize different radio technologies, such as cellular and/or WLAN radio access technologies, and may thus be referred to as access points. The base stations 105 may be associated with the same or different access networks or operator deployments. The coverage areas of different base stations 105, including the coverage areas of the same or different types of base stations 105, utilizing the same or different radio technologies, and/or belonging to the same or different access networks, may overlap.

In LTE/LTE-A network communication systems, the terms evolved Node B (eNodeB or eNB) may be generally used to describe the base stations 105. The wireless communications system 100 may be a Heterogeneous LTE/LTE-A network in which different types of access points provide coverage for various geographical regions. For example, each base station 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the base stations 105 (e.g., eNBs or other access points) via a backhaul link 132 (e.g., S1 interface, etc.). The base stations 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks. Various UEs 115 within the system 100 may operate according to different wireless standards, or according to different versions (e.g., "releases") of a particular wireless standard. For example, certain UEs 115 may operate according to a version particular version of the LTE standard (e.g., LTE Release 11 or earlier). These devices may be referred to as legacy UEs because they utilize a legacy, or prior release of an existing standard. Likewise, other UEs 115 may operate according to a different version of the LTE standard (e.g., post-Release 11), or such devices may employ features beyond those specified in the LTE standard. Such UEs 115 may be referred to as non-legacy UEs, advanced UEs, enhanced UEs, low latency UEs, hybrid UEs, or the like.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures for FDD (e.g., frame structure type 1) and TDD (e.g., frame structure type 2) may be defined.

In some examples of the system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

The term "component carrier" may refer to each of the multiple carriers utilized by a UE in CA operation, and may be distinct from other portions of system bandwidth. For instance, a component carrier may be a relatively narrow-bandwidth carrier susceptible of being utilized independently or in combination with other component carriers. Each component carrier may provide the same capabilities as an isolated carrier based on Release 8 or Release 9 of the LTE standard, for instance. Multiple component carriers may be aggregated or utilized concurrently to provide some UEs 115 with greater bandwidth and, e.g., higher data rates. Thus, individual component carriers may be backwards compatible with legacy UEs 115 while other UEs 115 may be configured with multiple component carriers in a multi-carrier mode.

A carrier used for DL may be referred to as a DL CC, and a carrier used for UL may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc. A UE 115 may communicate with a single base station 105 utilizing multiple carriers, and may also communicate with multiple base stations simultaneously on different carriers. Each cell of a base station 105 may include an UL component carrier (CC) and a DL CC. The coverage area 110 of each serving cell for a base station 105 may be different (e.g., CCs on different frequency bands may experience different path loss).

In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information (UCI), and scheduling information transmitted on physical uplink control channel (PUCCH), are carried by the primary cell. Additional carriers may be designated as secondary carriers, or secondary component carriers (SCC), which may be served by secondary cells (SCells). Secondary cells may likewise be semi-statically configured on a per-UE basis. In some cases, secondary cells may not include or be configured to transmit the same control information as the primary cell. In some examples, and as described below, an enhanced component carrier (eCC) may be configured—e.g., as an SCell. An eCC may utilize nested system operation, which may be dynamically adjusted according to traffic conditions or latency needs of UEs 115 within the system. In some examples, a UE 115 may be assigned resources of a first CC (e.g., SCC) utilizing frequency resources of a second component carrier (e.g., PCC). For instance, one or more OFDM symbols of a subframe of the second CC may be configured to signal control information for resource segments of the first CC. Additionally or alternatively, a UE 115 may utilize one CC to transmit control information such as channel quality information (CQI), hybrid automatic repeat request (HARM) feedback (e.g., ACK/NACK), etc. to the base station 105. As described below, the resource segments of the first CC may have a duration less than a symbol period of the second CC.

In some cases, a UE 115 may be served by cells from two or more base stations 105 that are connected by a non-ideal backhaul link 134 in dual connectivity operation. For example, the connection between the serving base stations 105 may not be sufficient to facilitate precise timing coordination. Thus, in some cases, the cells serving a UE 115 may be divided into multiple timing adjustment group (TAGs). Each TAG may be associated with a different timing offset, such that the UE 115 may synchronize UL transmissions differently for different UL carriers.

In some examples, one cell may utilize licensed spectrum, while another cell may utilize unlicensed spectrum. An eCC may be configured for unlicensed spectrum, for instance. Broadly speaking, the unlicensed spectrum in some jurisdictions may range from 600 Megahertz (MHz) to 6 Gigahertz (GHz). As used herein, the term "unlicensed spectrum" or "shared spectrum" may thus refer to industrial, scientific and medical (ISM) radio bands, irrespective of the frequency of those bands. In some examples, unlicensed spectrum is the U-NII radio band, which may also be referred to as the 5 GHz or 5G band. By contrast, the term "licensed spectrum" or "cellular spectrum" may be used herein to refer to wireless spectrum utilized by wireless network operators under administrative license from a governing agency.

Figure 2:
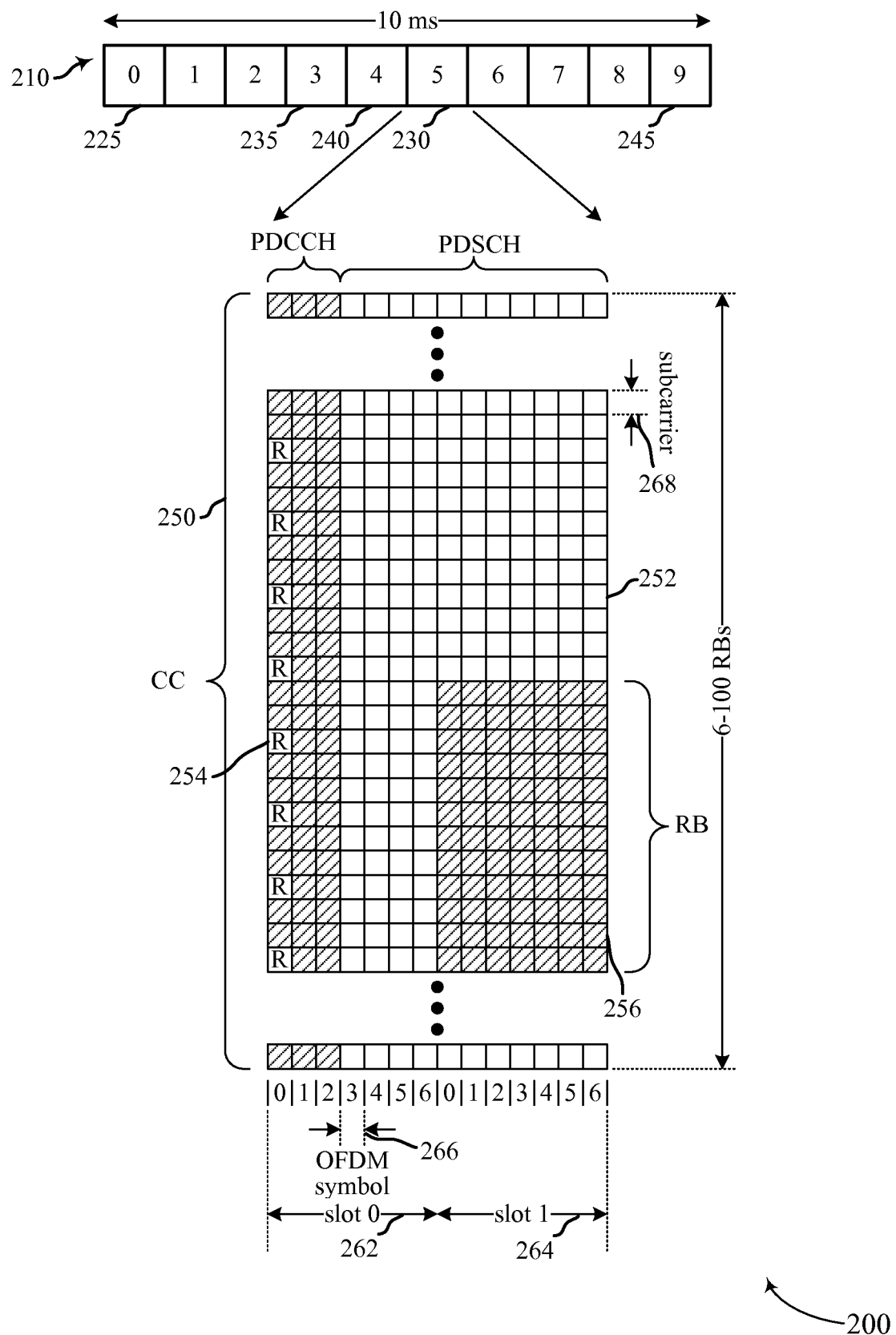
FIG. 2 illustrates an example of a frame structure that may be used in a wireless communication system to support nested system operation in accordance with various aspects of the present disclosure.

FIG. 2 is a diagram illustrating an example of a frame structure 200 that may be used in a wireless communication system, including the wireless communication system 100 described above with reference to the FIG. 1. For example, the frame structure 200 may be used to support nested system operation. A frame 210, which may have a 10 ms duration, may be divided into ten (10) equally sized subframes (e.g., subframe 225, 230, 235, 240, 245, etc.).

An OFDMA component carrier (CC) 250 may be illustrated as a resource grid representing the two time slots 262, 264, each time slot including seven OFDM symbols 266, for a normal cyclic prefix. Each OFDM symbol 266 may have a duration defined as a symbol period. As discussed in further detail below, each subframe 225, and thus one or both slots 262 or 264, may also include resource segments having a duration less than a symbol period. Accordingly, in some examples, CC 250 is an eCC configured to support low latency operations.

The resource grid may be divided into multiple resource elements 252. As with LTE/LTE-A systems, a resource block 256 may contain 12 consecutive subcarriers 268 in the frequency domain and, for a normal cyclic prefix in each OFDM symbol 266, 7 consecutive OFDM symbols 266 in the time domain, or 84 resource elements 252. The tone spacing for subcarriers 268 may be 15 kHz, and a useful symbol duration for OFDM symbols 266 may be 66.67 μs. OFDM symbols 266 may also include a cyclic prefix that is, for a normal LTE cyclic prefix, 5.1 μs for a first OFDM symbol 266 in each slot 262, 264, or 4.69 μs for other OFDM symbols 266.

In some examples, one or more OFDM symbols 266 within the subframe 230 structure may be divided into several resource segments having varying durations (as shown in FIG. 3). For instance, one resource segment having a duration that is less than a symbol period may be configured within subframe 225; and a second resource segment having a duration less than a symbol period may also be configured in subframe 225. These resource segments may have a total duration that is less than or equal to a symbol period. In some cases, one or both resource segments are configured with a cyclic prefix (CP). The subframe 225 may also have an OFDM symbol configured adjacent to the resource segments such that a control or data signal may be transmitted utilizing the symbol and the resource segments, where the signal duration spans the symbol period and the durations of the resource segments.

As illustrated in FIG. 2, some of the resource elements, designated R (e.g., RS resource element 254), may include DL reference signals (DL-RS). In system 100 of FIG. 1, for instance, a base station 105 may, for example, insert periodic DL-RS, or pilot symbols, such as common reference signals (CRS) to aid UEs 115 in channel estimation and coherent demodulation. CRS may include one of 504 different cell identities. They may be modulated using quadrature phase shift keying (QPSK) and power boosted (e.g., transmitted at 6 dB higher than the surrounding data elements) to make them resilient to noise and interference. CRS may be embedded in 4 to 16 resource elements, in each resource block based on the number of antenna ports or layers (up to 4) of the receiving UEs 115. Additionally or alternatively, CRS may be transmitted utilizing resource segments, as described below. In some examples, one or more subframes (e.g., 225, 230, 235, 240, 245) may be allocated for use by, and may thus have resources scheduled for, certain UEs 115, such as advanced UEs 115. In such instances, although no resources in the subframe may be scheduled for a legacy UE 115, a legacy UE 115 may nonetheless monitor the subframe for CRS. In some cases, in order to minimize interference for legacy UEs 115, consistent OFDM numerology (e.g., tone spacing, OFDM symbol, etc.) may be maintained to support communication for with both advanced UEs 115 and the legacy UEs 115.

In addition to CRS, which may be utilized by all UEs 115 in the coverage area 110 of the base station 105, demodulation reference signal (DMRS) may be directed toward specific UEs 115 and may be transmitted only on resource blocks, or resource segments, assigned to those UEs 115. DMRS may include signals on 6 resource elements in each resource block in which they are transmitted. In other examples, DMRS may be transmitted on a single resource segment, or on multiple resource segments. In some cases, two sets of DMRS may be transmitted in adjoining resource elements or in a combination of resource elements (e.g., symbols) and resource segments. In some cases, additional reference signals known as channel state information (CSI) reference signals may be included to aid in generating CSI. On the UL, a UE 115 may transmit a combination of periodic sounding reference signals (SRS) and UL DMRS for link adaptation and demodulation, respectively.

Figure 3A:
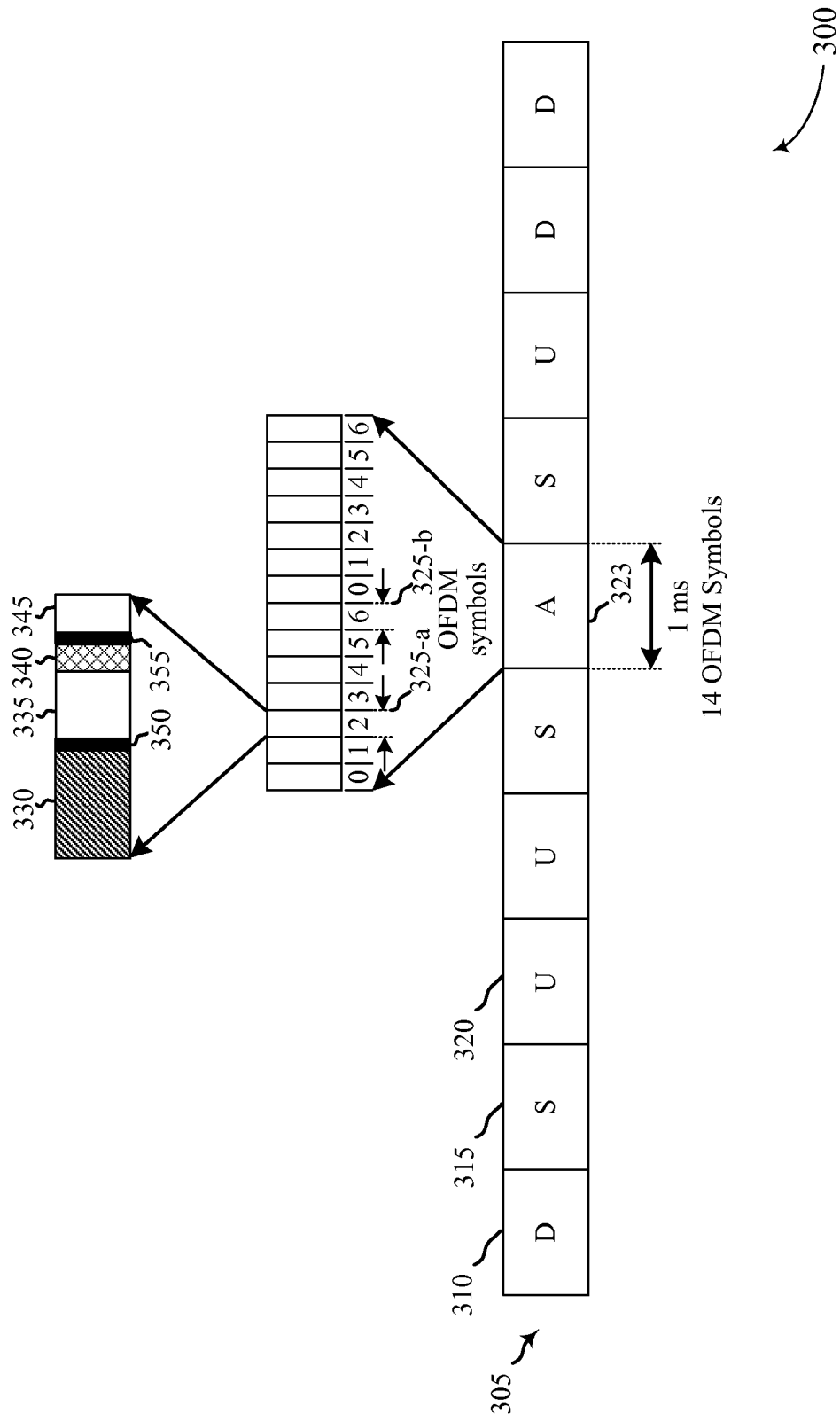
FIG. 3A illustrates an example of a block diagram conceptually illustrating an example of a radio frame and different subframes that may be transmitted or received in accordance with various aspects of the present disclosure.

FIG. 3A is a block diagram 300 conceptually illustrating an example of radio frame 305 that may be transmitted within a wireless communication system, in accordance with an aspect of the present disclosure. The radio frame 305 may be transmitted using portions of the wireless communications system 100 described with reference to FIG. 1 between one or more base stations 105 and one or more UEs 115, for example. Radio frame 305 may be a frame of an eCC, as described above. Radio frame 305 may include ten (10) 1 ms subframes variously configured for uplink and downlink communications, including downlink subframes 310, special subframes 315, uplink subframes 320, or adaptive subframe 323, or a combination thereof. The downlink subframes 310, special subframes 315, uplink subframes 320, and adaptive subframe 323 may include a subframe structure as discussed above with respect to FIG. 2, including fourteen (14) symbols 325 within each 1 ms subframe. In some examples, downlink subframes 310 may include downlink OFDM symbols, uplink subframes 320 may include SC-FDM symbols, and special subframes 315 and adaptive subframes 323 may include both uplink SC-FDM symbols and downlink OFDM symbols.

In some examples, certain subframes are configured with resource segments having a duration less than a symbol period. For instance, adaptive subframe 323 may include several OFDM symbols 325 that may be further subdivided into resource segments 330, 335, 340, and 345. Although each segment may be of varying length (e.g., duration), the total duration of the resource segments 330, 335, 340 and 345 may equal the symbol period of the OFDM symbols 325. Thus, a base station or UE may utilize the resource segments 330, 335, 340, and 345 to transmit or receive control or data signals, or both. In some examples, a control or data signal may span some or all of a resource segment (e.g., segment 345) and some or all of a symbol period of a symbol (e.g., OFDM symbol 325). In some cases, a portion of the subframe 323 is allocated for advanced UEs 115 (e.g., OFDM symbol 2), and the remaining portion of the subframe (e.g., OFDM symbols 0-1 or 3-13) may be allocated to legacy UEs 115. Additionally or alternatively, resource segments 330, 335, 340, 345 may include cyclic prefixes 350 and 355.

Therefore, in some examples, certain UEs, such as advanced UEs, may be configured to communicate using resources configured as OFDM symbols (e.g., OFDM symbol 325) or resources subdivided into resource segments (e.g., resource segment 335), or both. This flexible resource configuration may be utilized to support lower latency communication. For example, adaptive subframe 323 may be configured for time-division multiplexing such that various resource segments or symbols may be utilized for uplink and downlink communications. Alternatively, a downlink subframe (e.g., subframe 310) may be configured with resource segments (e.g., resource segments 335, 340, or 345). These segments may utilize wide-frequency bands and short durations, relative to a symbol period of an OFDM symbol 325, to provide downlink bursts. Uplink subframes (e.g., subframe 320) may be similarly configured to utilize resource segments.

In some examples, the duration of the one or more segments or OFDM numerology design of such segments (e.g., tone spacing or OFDM symbol length) may be based on a number of factors, including, for example, delay spreads, Doppler shifts, or the like. Additionally, because the configuration of certain resource segments configured for advanced UEs may affect resource allocation for legacy UEs, a duration of a resource segment may be defined with respect to legacy LTE system numerology.

An LTE OFDM symbol (e.g., 325) with a cyclic prefix may have a symbol period (e.g., a duration) of 71.4 μs (e.g., 66.67 µs OFDM symbol with 4.76 µs CP). Thus, in some cases, 71.4 µs may represent a duration within which resource segments may need to be synchronized for operation. For instance, if a resource segment is 16.67 µs in duration, four (4) such segments may be configured within an LTE symbol period, leaving 1.2 µs for a cyclic prefix, which may be too short in some cases. Alternatively, if three (3) resource segments of 16.67 µs are configured within an LTE symbol period, a cyclic prefix may be 7.1 µs, which may be too long in some cases. Accordingly, in some examples, three (3) 16.67 µs resource segments and one (1) 8.33 µs resource segment may be configured within an LTE symbol period, allowing for a cyclic prefix length of 3.27 µs, which may be preferable in some scenarios.

In other examples, resource segments may be configured within a duration of several LTE symbols. For instance, seven (7) 16.67 µs resource segments with a cyclic prefix of 3.73 µs may be configured within the duration of two (2) LTE symbols. The resource segments may thus not be divided evenly by LTE symbol period, but such a configuration may still support backward compatibility with proper resource allocation. For instance, if OFDM symbols 2 and 3 of adaptive subframe 323 are configured with resource segments as described, those two symbols may not be allocated to legacy UEs, but symbols 0, 1, and 4-13 may still be utilized by legacy UEs.

In some examples, one or more adaptive subframes 323 may be Multicast-broadcast single-frequency network (MBSFN) subframes used to provide multimedia multicast or broadcast services to certain UEs 115. The configuration of such subframes may be signaled to both advanced and legacy UEs within a system, for instance, in PBCH. A legacy UE 115 may not monitor the MBSFN portion of the MBSFN subframe, and thus may not attempt to decode the MBSFN portion, because the legacy UE may not be capable of receiving multicast or broadcast service, for example. As a result, the resources of the MBSFN portion of a an MBSFN subframe may be allocated to advanced UEs 115 without adversely impacting legacy UEs, because the legacy UE may not attempt to decode such information. Accordingly, in a system employing multicast-broadcast services, unused MBSFN subframes, or portions of MBSFN subframes, may be configured with resource segments have a duration less than an LTE symbol period. This configuration may provide for ready backward compatibility with legacy UEs.

Figure 3B:
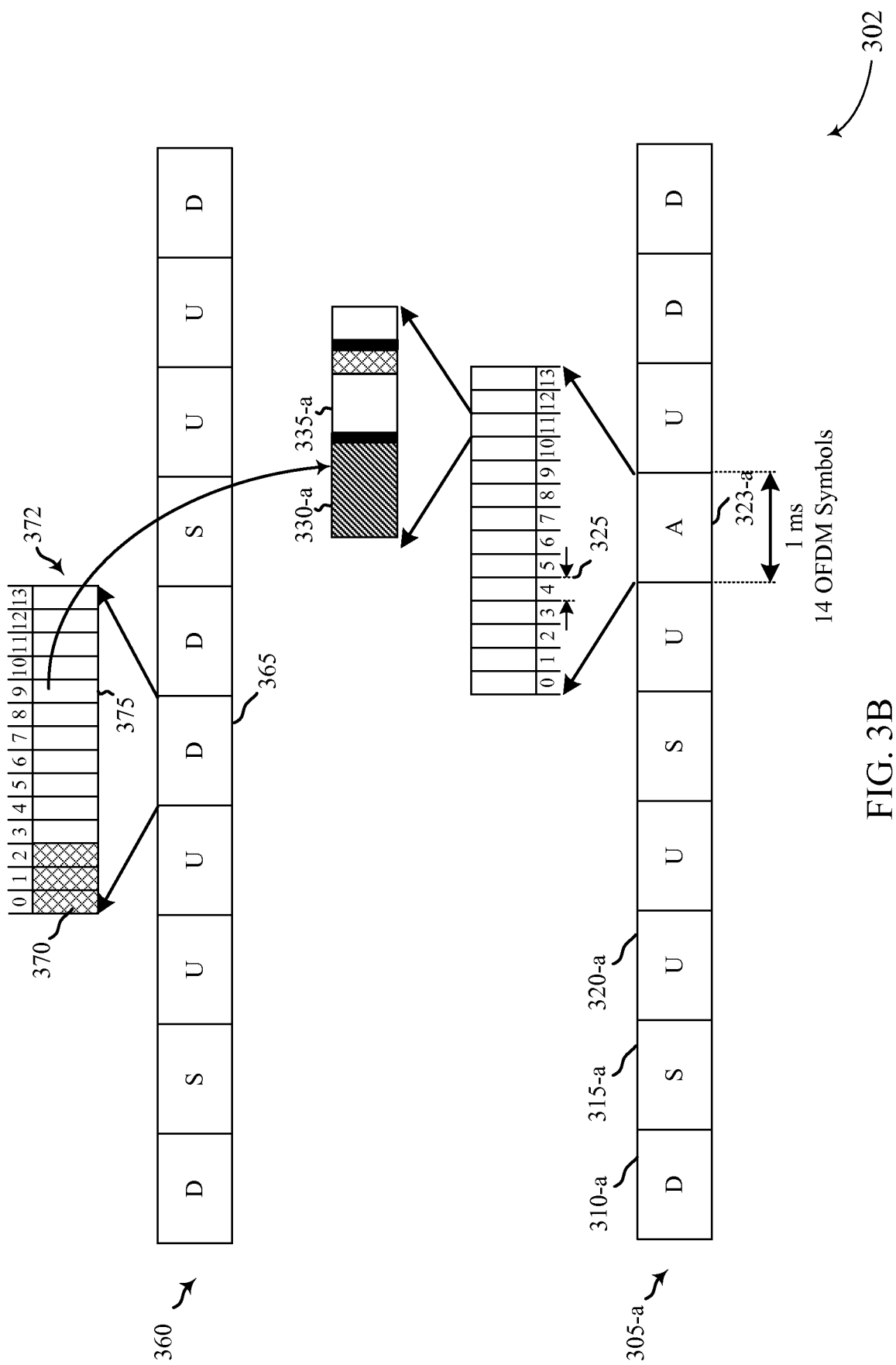
FIG. 3B illustrates an example of a block diagram conceptually illustrating an example of cross carrier scheduling in accordance with various aspects of the present disclosure.

FIG. 3B is a block diagram 302 conceptually illustrating an example of radio frames 305-*a* and 360 that may be transmitted within a wireless communication system, in accordance with an aspect of the present disclosure. The radio frames 305-*a* or 360 may be transmitted using portions of the wireless communications system 100 described with reference to FIG. 1 between one or more base stations 105 and one or more UEs 115, for example. Radio frame 305-*a* may be a frame of an eCC, as described above, and may be an example of radio frame 305 described above with reference to FIG. 3A.

As discussed above, radio frame 305-*a* may include ten (10) 1 ms subframes variously configured for uplink and downlink communications, including downlink subframes 310-*a*, special subframes 315-*a*, uplink subframes 320-*a*, or adaptive subframe 323-*a*, or a combination thereof. One or more adaptive subframes may include a subframe structure as discussed above with respect to FIG. 2, including fourteen (14) symbols 325 within each 1 ms subframe, which may be further configured with a number of resource segments.

Radio frame 360 may be a frame of another component carrier, which may be a PCC, for a UE 115. Radio frame 360 may also include a number of subframes (e.g., subframe 365), and may be further divided into symbol periods—e.g., a subframe 365 may have fourteen (14) OFDM symbols within each 1 ms subframe. Some of the OFDM symbols of a subframe may include control information, and may be referred to as a control region 370 and the remaining symbols may include or be allocated for data, and may be referred to as a data region 372). In some examples, OFDM symbols 375 (or a portion of an OFDM symbol) of the radio frame 360 of (e.g., a radio frame of one CC) may be utilized to schedule resources of the radio frame 305-*a* (e.g., a radio frame of an eCC). This cross-carrier scheduling may be performed utilizing, in some examples, resources of a data region 372 of a subframe 365. Thus, frequency resources of one CC may be utilized to schedule frequency resources of one or several resource segments 330-*a* or 335-*a* of adaptive subframe 323 of another CC. Additionally or alternatively, feedback related to the resource segments 330-*a* or 335-*a* (e.g., CQI, ACK/NACK, etc.) may be transmitted (and received) on frequency resources of the radio frame 360 (e.g., OFDM symbol 375).

The time lines of radio frames 305-*a* and 360 may be synchronized. For instance, a resource segment 330-*a* may be synchronized with a symbol period of an OFDM symbol 375. In some examples, the resource segments 330-*a* and 335-*a* are synchronized with several symbol periods of subframe 365. This synchronization may support cross-carrier scheduling, as described above, thus allowing a subset of resources of the radio frame 360 to be used for control of a subset of resources of radio frame 305-*a*. This may apply for uplink control signaling or downlink control signaling, or both.

As mentioned, reference signals—e.g., DMRS, CRS, CSI reference signals, etc. or measurement reference signals—may be transmitted in one or more segments 330, 335, 340, or 345, or may span the entire period of an OFDM symbol 325, of FIG. 3A or 3B. 325-*a*.

Figure 4A:
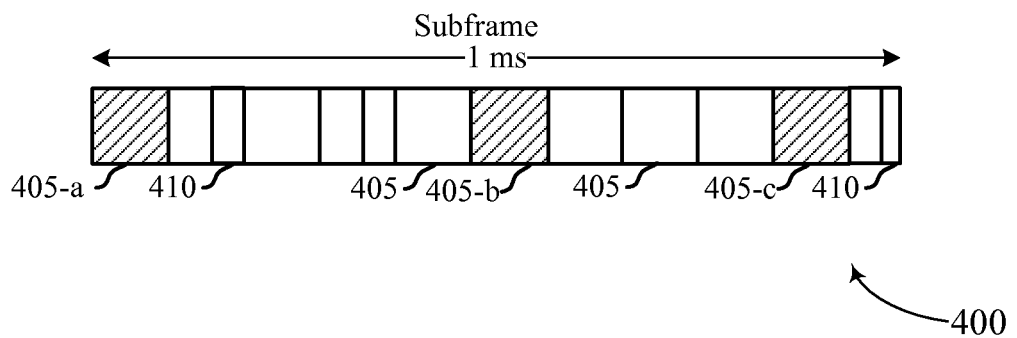
FIGS. 4A, 4B, and 4C illustrate examples of a block diagrams conceptually illustrating examples of radio subframes that may be transmitted or received in accordance with various aspects of the present disclosure.
Figure 4B:
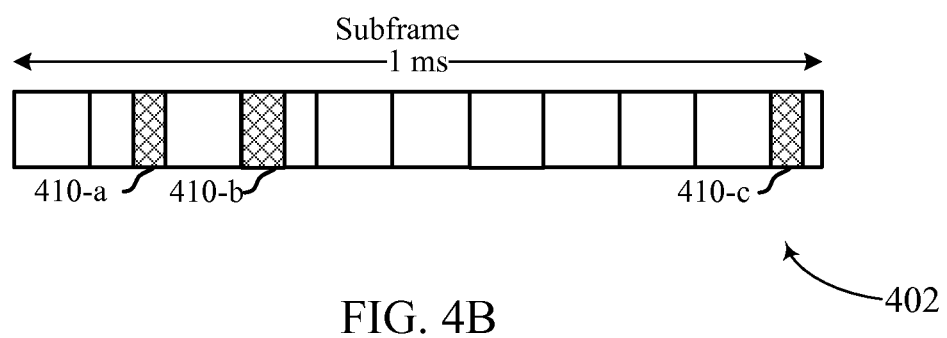
Figure 4C:
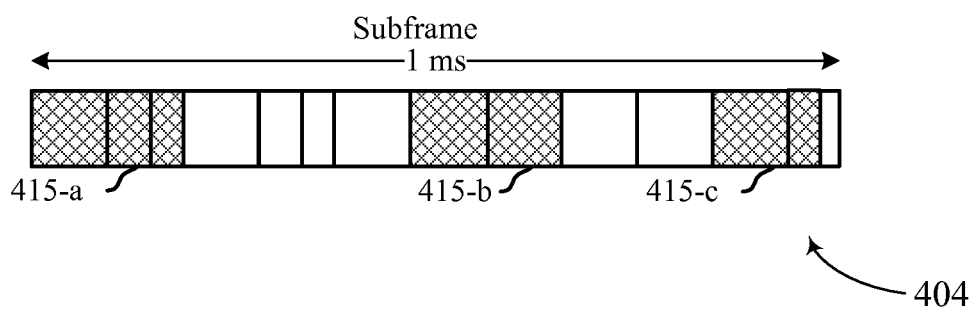

FIGS. 4A, 4B, and 4C are diagrams illustrating example subframe structures 400, 402, and 404, respectively, and various reference signal configurations that may be used in a wireless communication system, including the wireless communication system 100 described above with reference to FIG. 1. For example, the subframe structures 400, 402, and 404 may be used for a nested system configuration. Subframe structures 400, 402, and 404 may, for instance, be examples of subframes described with reference to FIG. 2 or 3.

In accordance with the present disclosure, subframe structures 400, 402, and 404 may include one or several resource segments 405, 410 of varying durations, as well as several symbols having a symbol period (e.g., symbol 325-*a* illustrated in FIG. 3). In some examples, a resource segment may span an OFDM symbol period (e.g., a resource segment 405 may be equivalent to an OFDM symbol). Additionally or alternatively, subframe structures 400, 402, and 404 may include resource segments 410 having duration that is less than a regular OFDM symbol period.

The resource segments may be configured to include DMRS, CRS, CSI reference signals, or the like. For example, as illustrated in FIG. 4A, reference signals may be transmitted in an OFDM symbol having a symbol period (e.g., 405-*a* through 405-*c*). In some examples, reference signals may be transmitted over one or several resource segments 410-*a* through 410-*c*, as illustrated in FIG. 4B. In other examples, one or more reference signals may span a several resource segments 415-*a* of a subframe 404, as illustrated in FIG. 4C. In other words, a reference signal may be transmitted within a symbol, over several symbols, within a single resource segment, over several resource segments, or over a combination of symbols and resource segments. In various examples, this flexibility in reference signal assignment may allow either legacy UEs or non-legacy UEs, or both, to utilize reference signals transmitted within a subframe structure 400, 402, 404.

Figure 5:
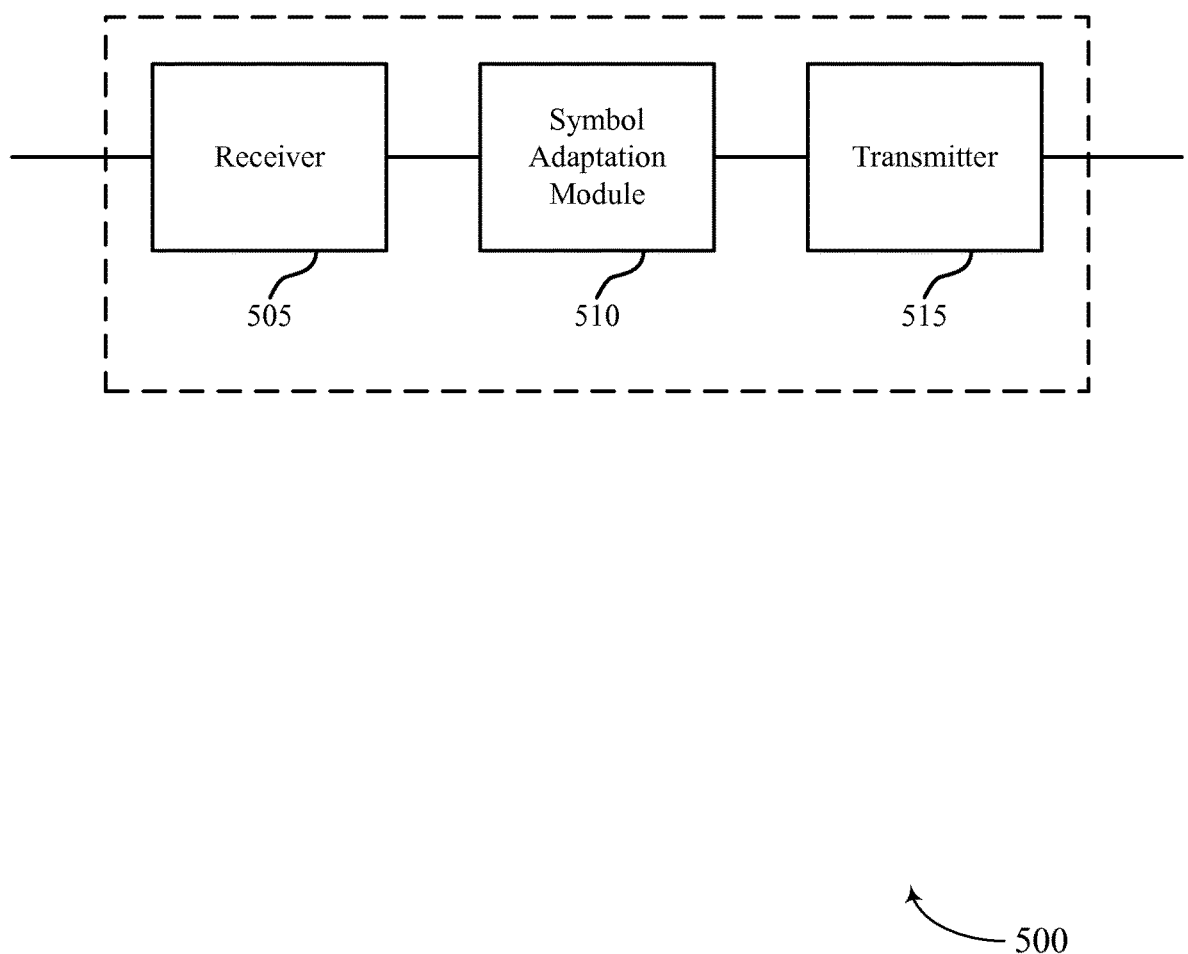
FIG. 5 shows a block diagram of a device that supports nested system operation in accordance with various aspects of the present disclosure.

FIG. 5 shows a block diagram of a wireless device 500 that supports nested system operation in accordance with various aspects of the present disclosure. Wireless device 500 may be an example of aspects of a UE 115 or base station 105 described with reference to FIGS. 1-4. Wireless device 500 may include a receiver 505, a symbol adaptation module 510, or a transmitter 515. Wireless device 500 may also include a processor. Each of these components may be in communication with one another.

The receiver 505 may receive information such as packets, user data, or control information associated with various information channels—e.g., control channels, data channels, and information related to nested system operation, etc. Information may be passed on to the symbol adaptation module 510, and to other components of wireless device 500.

The symbol adaptation module 510 may configure a first resource segment having a first duration that is less than a symbol period, and it may configure a second resource segment having a second duration that is less than the symbol period. A total duration of the first and second durations may, for example, be less than or equal to the symbol period, and communicate utilizing the configured first and second resource segments.

The transmitter 515 may transmit signals received from other components of wireless device 500. In some examples, the transmitter 515 may be collocated with the receiver 505 in a transceiver. The transmitter 515 may include a single antenna, or it may include a plurality of antennas.

Figure 6:
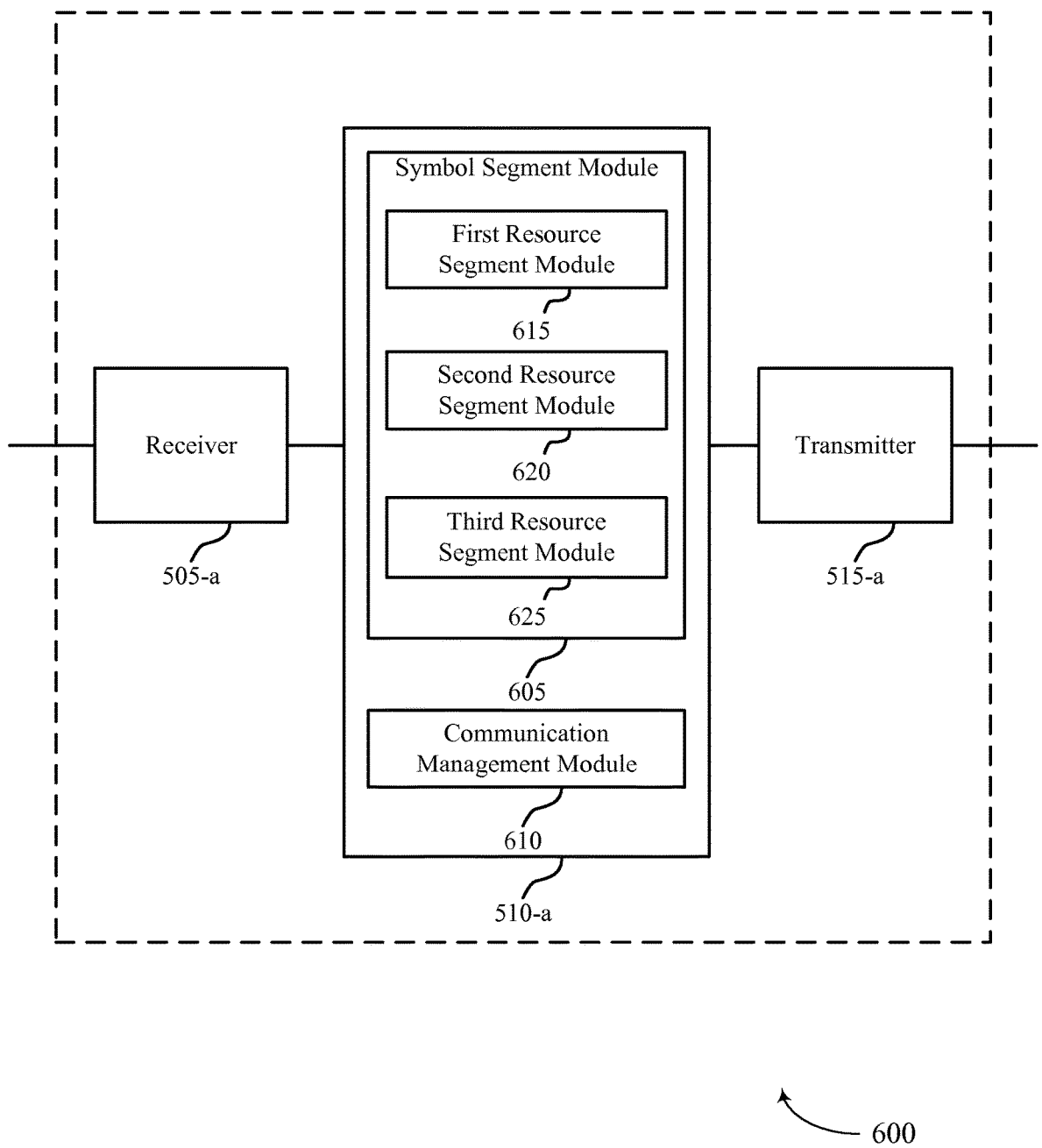
FIG. 6 shows a block diagram of a device that supports nested system operation in accordance with various aspects of the present disclosure.

FIG. 6 shows a block diagram of a wireless device 600 that supports nested system operation in accordance with various aspects of the present disclosure. Wireless device 600 may be an example of aspects of a wireless device 500, a UE 115, or base station 105 described with reference to FIGS. 1-5. Wireless device 600 may include a receiver 505-*a*, a symbol adaptation module 510-*a*, or a transmitter 515-*a*. Wireless device 600 may also include a processor. Each of these components may be in communication with one another. The symbol adaptation module 510-*a* may also include a symbol segment module 605, and a communication management module 610.

The receiver 505-*a* may receive information which may be passed on to symbol adaptation module 510-*a*, and to other components of a UE 115 or base station 105. The symbol adaptation module 510-*a* may perform the operations described above with reference to FIG. 5. The transmitter 515-*a* may transmit signals received from other components of wireless device 600.

The symbol segment module 605 may configure a first resource segment having a first duration that is less than a symbol period as described above with reference to FIGS. 2-4. The symbol segment module 605 may also configure a second resource segment having a second duration that is less than the symbol period, such that a total duration of the first and second durations is less than or equal to the symbol period. In some examples, the first resource segment may be configured to utilize the first resource segment module 615. Similarly, the second resource segment may be configured utilizing the second resource segment module 620. In some examples, the first resource segment may include a first CP, and the second resource segment may include a second CP. The symbol segment module 605 may also configure a third resource segment having a third duration that is less than the symbol period, such that a total duration of the first, second, and third durations is greater than the symbol period. The third resource segment may be configured utilizing the third resource segment module 625.

In some examples, the symbol segment module 605 may also identify a first resource segment having a first duration that is less than a symbol period. The symbol segment module 605 may also identify a second resource segment having a second duration that is less than the symbol period, where a total duration of the first and second durations is less than or equal to the symbol period. The symbol segment module 605 may also identify a third resource segment having a third duration that is less than the symbol period, where a total duration of the first, second, and third durations is greater than the symbol period.

The communication management module 610 may communicate utilizing the configured first and second resource segments as described above with reference to FIGS. 2-4. In some examples, communicating may include communicating utilizing the configured symbol, the configured first resource segment, the configured second resource segment, or combination thereof in a common subframe.

In some examples, communicating may include transmitting a control or data signal in the first resource segment, the second resource segment, and a symbol having the symbol period. The control or data signal may thus span the first and second durations and the symbol period.

The communication management module 610 may also communicate utilizing the configured first, second, and third resource segments. In some examples, communicating includes transmitting a control or data signal in the first resource segment, the second resource segment, and the third resource segment, and the control or data signal may span the first, second, and third durations. The communication management module 610 may also communicate with a node utilizing the first and second resource segments. In some examples, communicating with the node includes communicating utilizing the symbol and the first and second resource segments in a common subframe.

In some examples, communicating with the node includes receiving a control or data signal in the first resource segment, the second resource segment, and a symbol having the symbol period. The control or data signal may thus span the first and second durations and the symbol period. The communication management module 610 may also communicate utilizing the first, second, and third resource segments. In some examples, communicating with the node includes receiving a control or data signal in the first resource segment, the second resource segment, and the third resource segments, where the control or data signal spans the first, second, and third durations.

In some examples, first and second resource segments may be frequency resources of a first component carrier. The communication management module 610 may thus schedule the frequency resources of the first component carrier using frequency resources of a second component carrier. In some cases, the receiver 505-*a*, in combination with the communication management module may receive feedback related to the first or second resource segments on the frequency resources of the second component carrier. Alternatively, the receiver 505-*a*, in combination with the communication management module 610, may receive grants for the frequency resources of the first component carrier on frequency resources of a second component carrier. In some examples, the transmitter 515-*a* may transmit feedback related to the first or second resource segments on the frequency resources of the second component carrier.

Figure 7:
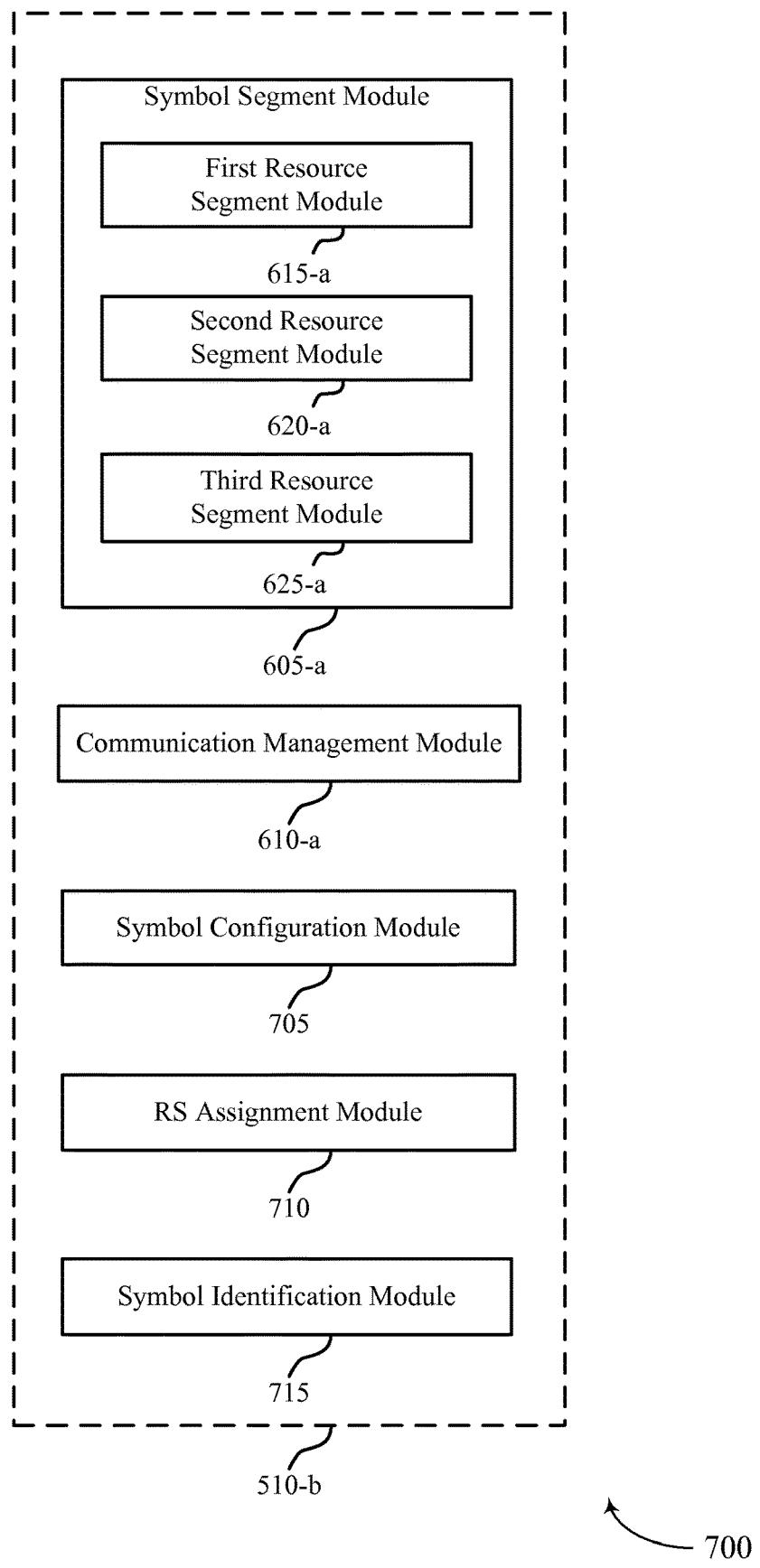
FIG. 7 shows a block diagram of a symbol adaptation module that supports nested system operation in accordance with various aspects of the present disclosure.

FIG. 7 shows a block diagram 700 of a symbol adaptation module 510-*b* which may be a component of a wireless device 500 or a wireless device 600 that support nested system operation in accordance with various aspects of the present disclosure. The symbol adaptation module 510-*b* may be an example of aspects of a symbol adaptation module 510 described with reference to FIGS. 5-6. The symbol adaptation module 510-*b* may include a symbol segment module 605-*a*, and a communication management module 610-*a*. Each of these modules may perform the functions described above with reference to FIG. 6. The symbol adaptation module 510-*b* may also include a symbol configuration module 705, a RS assignment module 710, and a symbol identification module 715.

The symbol configuration module 705 may configure a symbol having the symbol period, where communicating with the wireless device includes communicating utilizing the configured symbol the configured first and second resource segments as described above with reference to FIGS. 2-4.

The RS assignment module 710 may be configured such that the first resource segment, the second resource segment, or a combination thereof may include a DMRS as described above with reference to FIGS. 2-4. In some examples, a symbol includes a portion of the DMRS, where the symbol has a duration of the symbol period, and where the DMRS spans the first and second durations and the symbol period. In some examples, the first resource segment, the second resource segment, or combination thereof may include a CRS. A symbol may thus include a portion of the CRS, where the symbol has a duration of the symbol period, and where the CRS spans the first and second durations and the symbol period. In some examples, the first resource segment, the second resource segment, or combination thereof include a CSI reference signal. In some examples, a resource, such as a symbol, includes a portion of the CSI reference signal, where the symbol has a duration of the symbol period, and where the CSI reference signal spans the first and second durations and the symbol period.

The symbol identification module 715 may identify a symbol having the symbol period, such that communicating may include communicating utilizing the symbol and the first and second resource segments as described above with reference to FIGS. 2-4.

The components of wireless device 500, wireless device 600, or symbol adaptation module 510-*b* may each, individually or collectively, be implemented with at least one application specific integrated circuit (ASIC) adapted to perform some or all of the applicable functions in hardware. Alternatively, the functions may be performed by one or more other processing units (or cores), on at least one IC. In other examples other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 8:
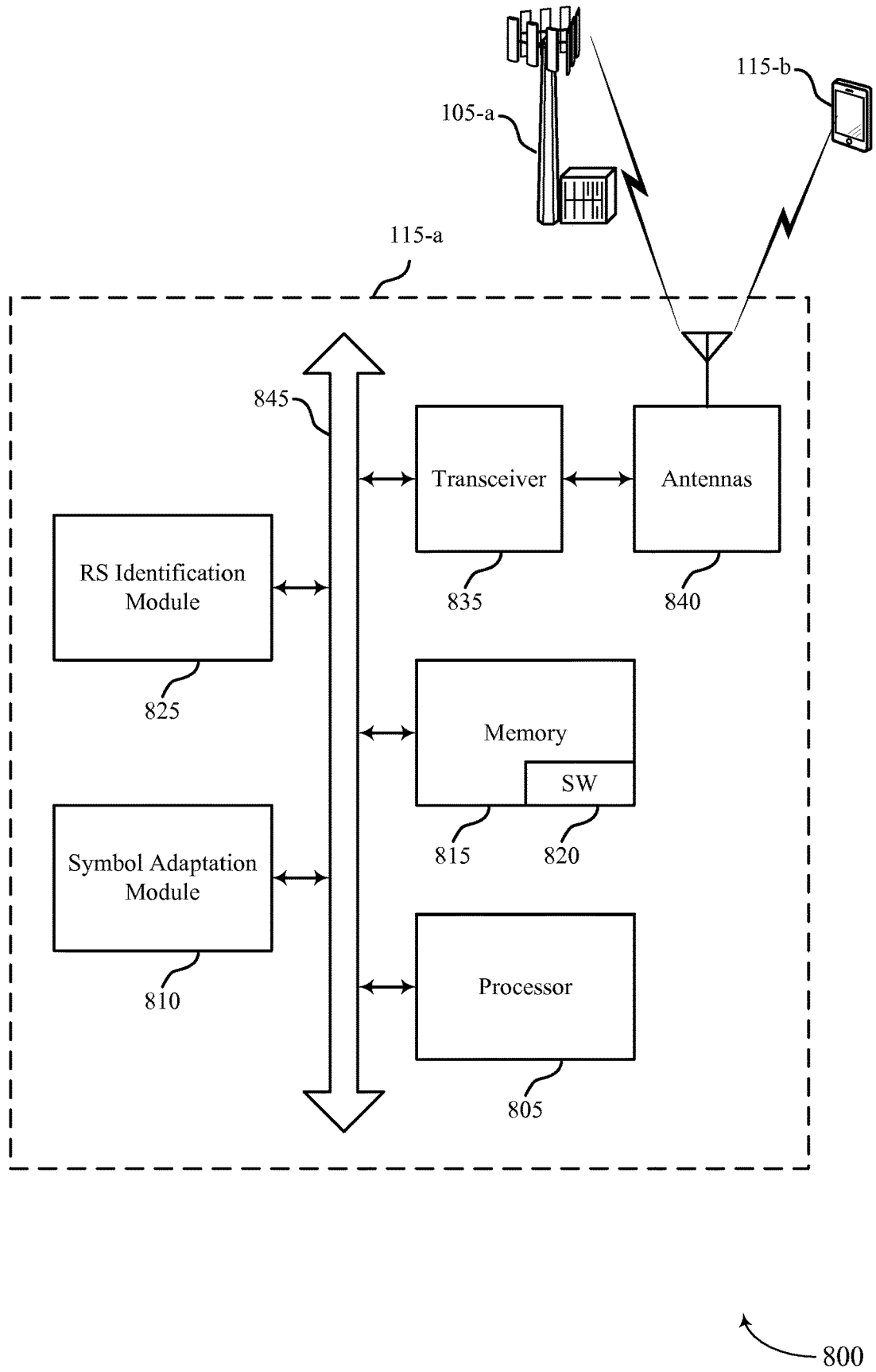
FIG. 8 illustrates a block diagram of a system including a mobile device that supports nested system operation in accordance with various aspects of the present disclosure.

FIG. 8 shows a diagram of a system 800 including a UE 115 that supports nested system operation in accordance with various aspects of the present disclosure. System 800 may include UE 115-*a*, which may be an example of a wireless device 500 or a wireless device 600, described above with reference to FIGS. 1 and 5-7. UE 115-*a* may include a symbol adaptation module 810, which may be an example of a symbol adaptation module 510 described with reference to FIGS. 5-7. UE 115-*a* may also include an RS identification module 825. UE 115-*a* may also include components for bi-directional voice and data communications including components for transmitting communications and components for receiving communications. For example, UE 115-*a* may communicate bi-directionally with base station 105-*a* or UE 115-*b*. UE 115-*a* may be an example of a non-legacy UE.

The RS identification module 825 may be configured such that the first resource segment, the second resource segment, or combination thereof may include a DMRS as described above with reference to FIGS. 2-4. In some examples, a symbol includes a portion of the DMRS, the symbol having the symbol period, and where the DMRS spans the first and second durations and the symbol period. In some examples, the first resource segment, the second resource segment, or combination thereof includes a CRS. In some examples, a symbol includes a portion of the CRS, the symbol having the symbol period, and where the CRS spans the first and second durations and the symbol period. In some examples, the first resource segment, the second resource segment, or combination thereof includes a CSI reference signal. In some examples, a symbol includes a portion of the CSI reference signal, the symbol having the symbol period, and where the CSI reference signal spans the first and second durations and the symbol period.

UE 115-*a* may also include a processor 805, and memory 815 (including software (SW) 820), a transceiver 835, and one or more antenna(s) 840, each of which may communicate, directly or indirectly, with one another (e.g., via bus or buses 845). The transceiver 835 may communicate bi-directionally, via the antenna(s) 840 or wired or wireless links, with one or more networks, as described above. For example, the transceiver 835 may communicate bi-directionally with a base station 105 or another UE 115. The transceiver 835 may include a modem to modulate the packets and provide the modulated packets to the antenna(s) 840 for transmission, and to demodulate packets received from the antenna(s) 840. While UE 115-*a* may include a single antenna 840, UE 115-*a* may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform or cause UE 115-*a* to perform various functions described herein (e.g., nested system operation, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an ASIC, etc.).

Figure 9:
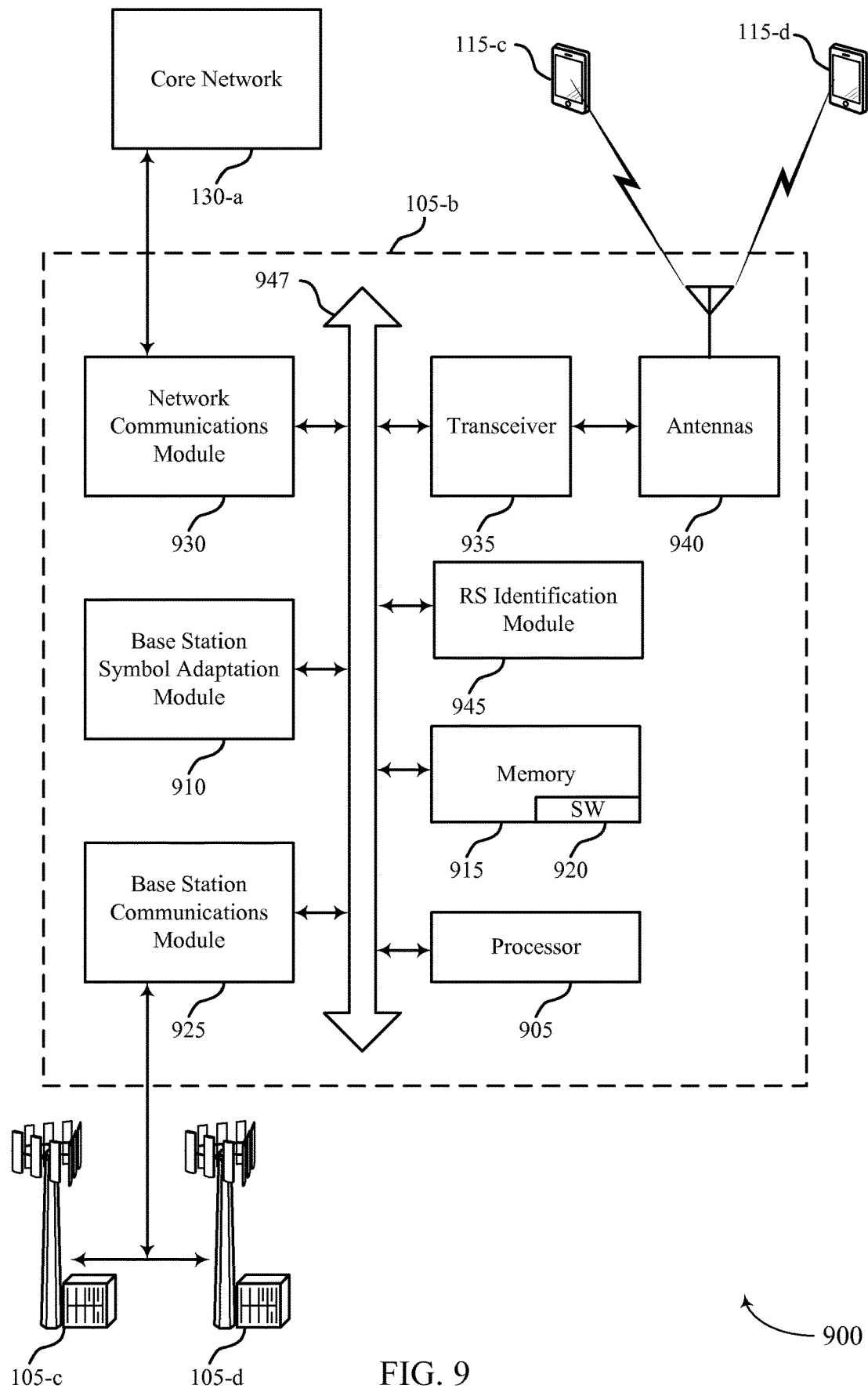
FIG. 9 illustrates a block diagram of a system including a base station that supports nested system operation in accordance with various aspects of the present disclosure.

FIG. 9 shows a diagram of a system 900 including a base station 105 that supports nested system operation in accordance with various aspects of the present disclosure. System 900 may include base station 105-*b*, which may be an example of a wireless device 500, a wireless device 600, a symbol adaptation module 510-*b*, or a base station 105 described above with reference to FIGS. 1 and 5-7. Base Station 105-*b* may include a base station symbol adaptation module 910, which may be an example of a base station symbol adaptation module 910 described with reference to FIGS. 6-8. Base Station 105-*b* may also include components for bi-directional voice and data communications including components for transmitting communications and components for receiving communications. In some examples, the base station 105-*b* may also include a reference signal identification module 945.

In some cases, base station 105-*b* may have one or more wired backhaul links. Base station 105-*b* may have a wired backhaul link (e.g., S1 interface, etc.) to the core network 130. Base station 105-*b* may also communicate with other base stations 105, such as base station 105-*c* and base station 105-*d* via inter-base station backhaul links (e.g., an X2 interface). Each of the base stations 105 may communicate with UEs 115 using the same or different wireless communications technologies. In some cases, base station 105-*b* may communicate with other base stations such as 105-*c* or 105-*d* utilizing base station communications module 925. In some examples, base station communications module 925 may provide an X2 interface within an LTE/LTE-A wireless communication network technology to provide communication between some of the base stations 105. In some embodiments, base station 105-*b* may communicate with other base stations through core network 130. In some cases, base station 105-*b* may communicate with the core network 130 through network communications module 930.

The base station 105-*b* may include a processor 905, memory 915 (including software (SW) 920), transceiver 935, and antenna(s) 940, which each may be in communication, directly or indirectly, with one another (e.g., over bus or buses 947). The transceiver 935 may be configured to communicate bi-directionally, via the antenna(s) 940, with the UEs 115, which may be multi-mode devices. The transceiver 935 (or other components of the base station 105-*b*) may also be configured to communicate bi-directionally, via the antennas 940, with one or more other base stations (not shown). The transceiver 935 may include a modem configured to modulate the packets and provide the modulated packets to the antennas 940 for transmission, and to demodulate packets received from the antennas 940. The base station 105-*b* may include multiple transceiver 935, each with one or more associated antennas 940. The transceiver 935 may be an example of a combined receiver 505 and transmitter 515 of FIG. 5.

The memory 915 may include RAM and ROM. The memory 915 may also store computer-readable, computer-executable software code 920 containing instructions that are configured to, when executed, cause the processor 905 to perform or cause base station 105-*b* to perform various functions described herein (e.g., nested system operation, etc.). Alternatively, the software code 920 may not be directly executable by the processor 905 but be configured to cause the computer, e.g., when compiled and executed, to perform functions described herein. The processor 905 may include an intelligent hardware device, e.g., a CPU, a microcontroller, an ASIC, etc. The processor 905 may include various special purpose processors such as encoders, queue processing modules, base band processors, radio head controllers, digital signal processor (DSPs), and the like. The base station communications module 925 may manage communications with other base stations 105. The communications management module may include a controller or scheduler for controlling communications with UEs 115 in cooperation with other base stations 105. For example, the base station communications module 925 may coordinate scheduling for transmissions to UEs 115 for various interference mitigation techniques such as beamforming or joint transmission.

The RS identification module 945 may be configured such that the first resource segment, the second resource segment, or combination thereof may include a DMRS as described above with reference to FIGS. 2-4. In some examples, a symbol includes a portion of the DMRS, the symbol having the symbol period, and where the DMRS spans the first and second durations and the symbol period. In some examples, the first resource segment, the second resource segment, or combination thereof includes a CRS. In some examples, a symbol includes a portion of the CRS, the symbol having the symbol period, and where the CRS spans the first and second durations and the symbol period. In some examples, the first resource segment, the second resource segment, or combination thereof includes a CSI reference signal. In some examples, a symbol includes a portion of the CSI reference signal, the symbol having the symbol period, and where the CSI reference signal spans the first and second durations and the symbol period.

Figure 10:
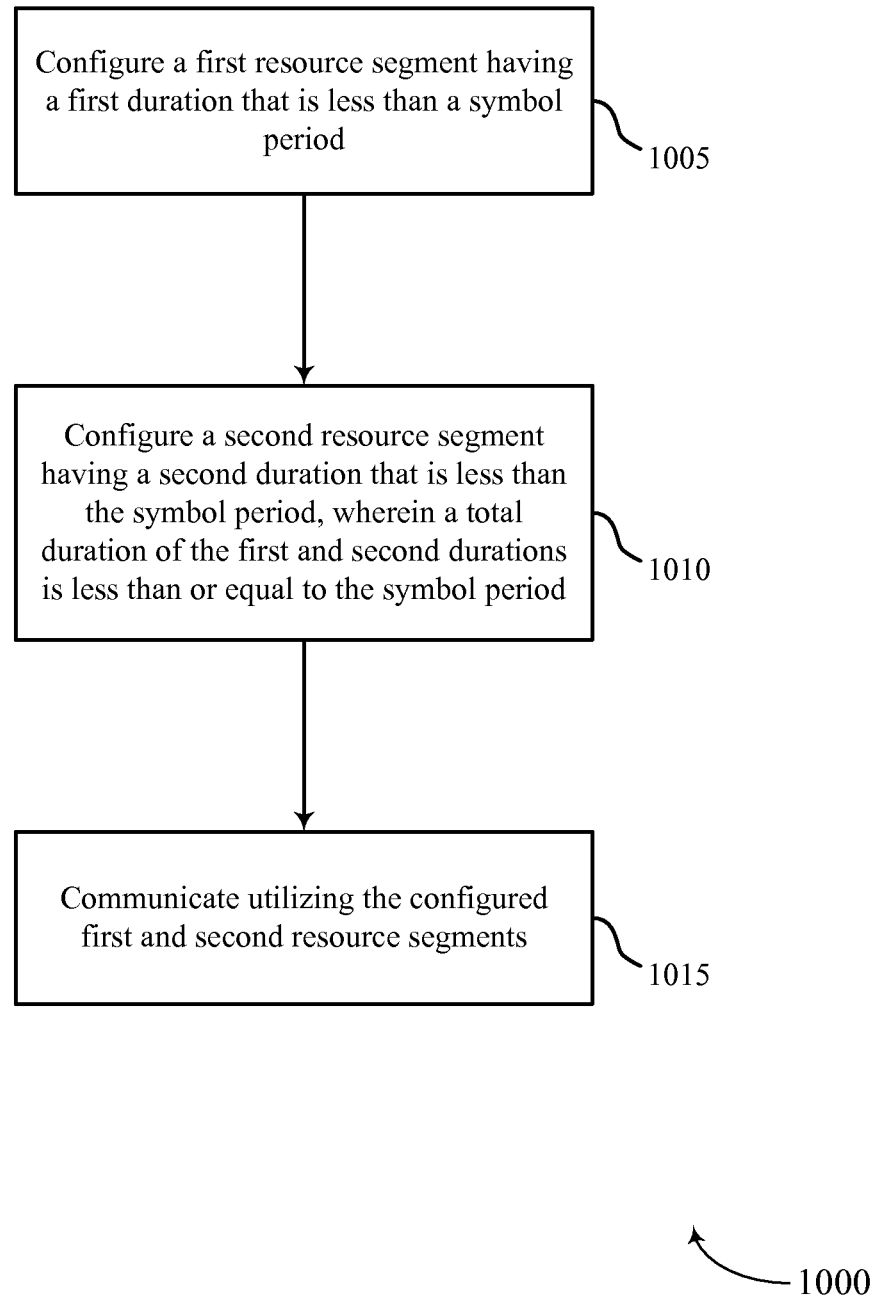
FIG. 10 shows a flowchart illustrating a method for nested system operation in accordance with various aspects of the present disclosure.

FIG. 10 shows a flowchart illustrating a method 1000 for wireless communication that supports nested system operation in accordance with various aspects of the present disclosure. The operations of method 1000 may be implemented by a UE 115 or base station 105 or its components as described with reference to FIGS. 1-9. For example, the operations of method 1000 may be performed by the symbol adaptation module 510, symbol adaptation module 810, or base station symbol adaptation module 910, as described with reference to FIGS. 5-9. In some examples, a device (e.g., base station 105 or UE 115) may execute a set of codes to control the functional elements to perform the functions described below. Additionally or alternatively, the device may perform aspects the functions described below using special-purpose hardware.

At block 1005, the device may configure a first resource segment having a first duration that is less than a symbol period as described above with reference to FIGS. 2-4. In certain examples, the operations of block 1005 may be performed by the symbol segment module 605 as described above with reference to FIG. 6.

At block 1010, the device may configure a second resource segment having a second duration that is less than the symbol period, where a total duration of the first and second durations is less than or equal to the symbol period as described above with reference to FIGS. 2-4. In certain examples, the operations of block 1010 may be performed by the symbol segment module 605 as described above with reference to FIG. 6.

At block 1015, the device may communicate utilizing the configured first and second resource segments as described above with reference to FIGS. 2-4. In certain examples, the operations of block 1015 may be performed by the communication management module 610 as described above with reference to FIG. 6.

Figure 11:
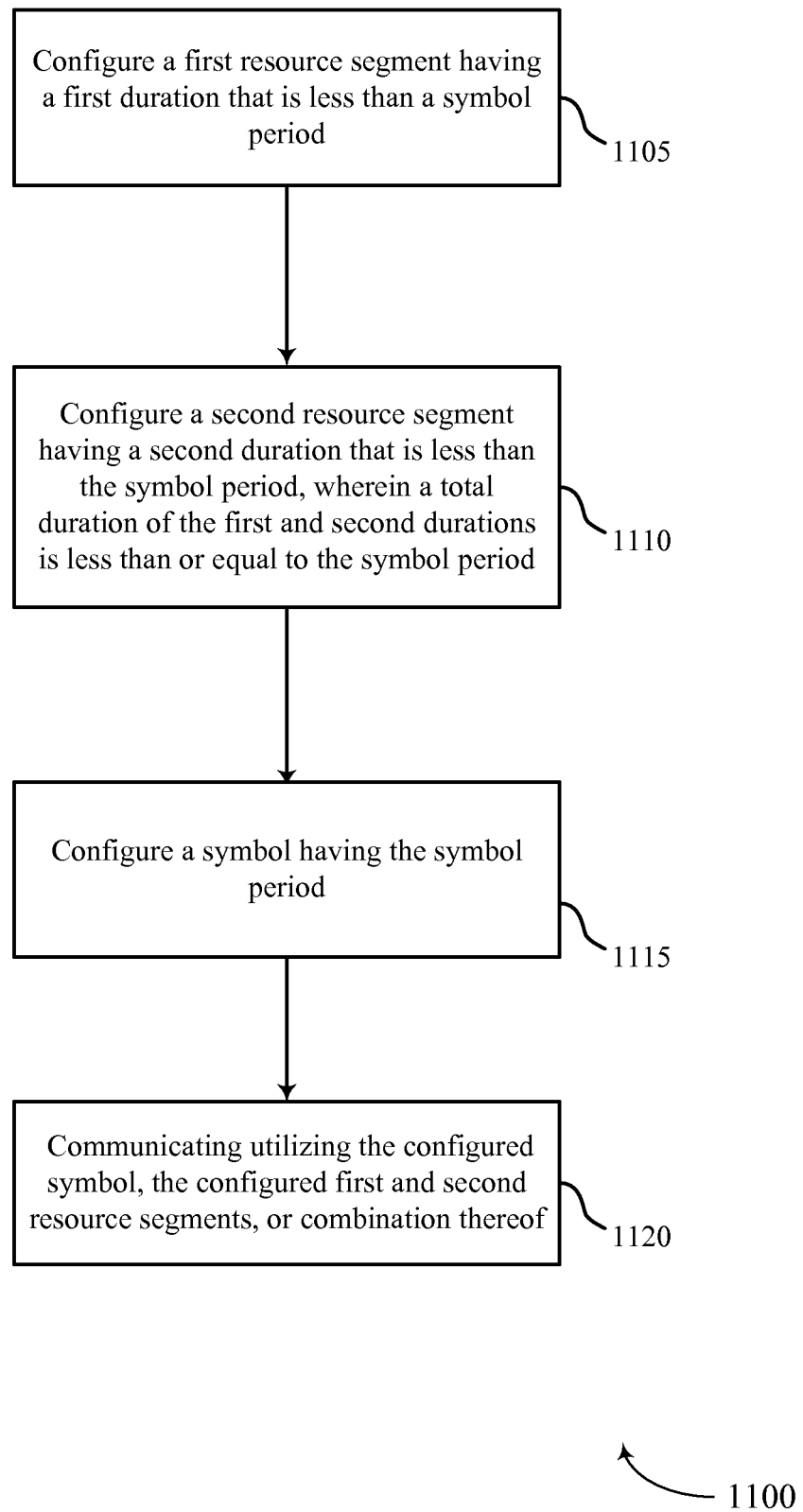
FIG. 11 shows a flowchart illustrating a method for nested system operation in accordance with various aspects of the present disclosure.

FIG. 11 shows a flowchart illustrating a method 1100 for wireless communication that supports nested system operation in accordance with various aspects of the present disclosure. The operations of method 1100 may be implemented by a UE 115, base station 105 or its components as described with reference to FIGS. 1-9. For example, the operations of method 1100 may be performed by the symbol adaptation module 510, symbol adaptation module 810, or base station symbol adaptation module 910, as described with reference to FIGS. 5-9. In some examples, a device (e.g., base station 105 or UE 115) may execute a set of codes to control the functional elements of the device to perform the functions described below. Additionally or alternatively, the device may perform aspects the functions described below using special-purpose hardware. The method 1100 may also incorporate aspects of method 1000 of FIG. 10.

At block 1105, the device may configure a first resource segment having a first duration that is less than a symbol period as described above with reference to FIGS. 2-4. In certain examples, the operations of block 1105 may be performed by the symbol segment module 605 as described above with reference to FIG. 6.

At block 1110, the device may configure a second resource segment having a second duration that is less than the symbol period, where a total duration of the first and second durations is less than or equal to the symbol period as described above with reference to FIGS. 2-4. In certain examples, the operations of block 1110 may be performed by the symbol segment module 605 as described above with reference to FIG. 6.

At block 1115, the device may configure a symbol having the symbol period. In certain examples, the operations of block 1115 may be performed by the symbol configuration module 705 as described above with reference to FIG. 7.

At block 1120, the device may communicate utilizing the configured symbol, the configured first and second resource segments, or combination thereof as described above with reference to FIGS. 2-4. In certain examples, the operations of block 1120 may be performed by the communication management module 610 as described above with reference to FIG. 6. In some examples, the first and second resource segments include frequency resources of a first component carrier, and the device may schedule the frequency resources of the first component carrier utilizing resources of a second component carrier. Additionally or alternatively, the device may receive feedback related to the first or second resource segments on the frequency resources of the second component carrier.

Figure 12:
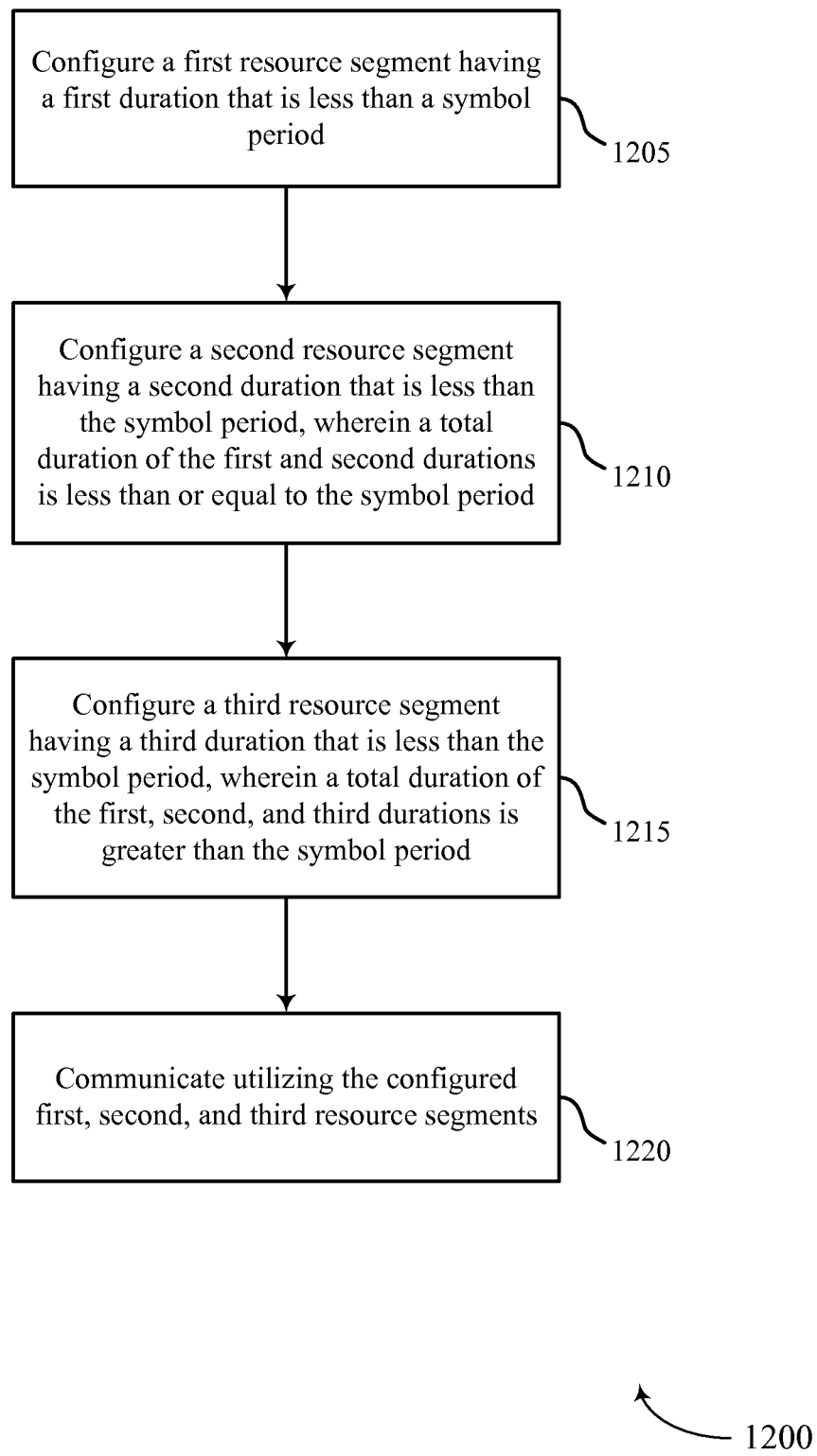
FIG. 12 shows a flowchart illustrating a method for nested system operation in accordance with various aspects of the present disclosure.

FIG. 12 shows a flowchart illustrating a method 1200 for wireless communication that supports nested system operation in accordance with various aspects of the present disclosure. The operations of method 1200 may be implemented by a UE 115, base station 105 or its components as described with reference to FIGS. 1-9. For example, the operations of method 1200 may be performed by the symbol adaptation module 510, symbol adaptation module 810, or base station symbol adaptation module 910, as described with reference to FIGS. 5-9. In some examples, a device (e.g., base station 105 or UE 115) may execute a set of codes to control the functional elements to perform the functions described below. Additionally or alternatively, the device may perform aspects the functions described below using special-purpose hardware. The method 1200 may also incorporate aspects of methods 1000 and 1100 of FIGS. 10-11.

At block 1205, the device may configure a first resource segment having a first duration that is less than a symbol period as described above with reference to FIGS. 2-4. In certain examples, the operations of block 1205 may be performed by the symbol segment module 605 as described above with reference to FIG. 6.

At block 1210, the device may configure a second resource segment having a second duration that is less than the symbol period, where a total duration of the first and second durations is less than or equal to the symbol period as described above with reference to FIGS. 2-4. In certain examples, the operations of block 1210 may be performed by the symbol segment module 605 as described above with reference to FIG. 6.

At block 1215, the device may configure a third resource segment having a third duration that is less than the symbol period, where a total duration of the first, second, and third durations is greater than the symbol period as described above with reference to FIGS. 2-4. In certain examples, the operations of block 1215 may be performed by the symbol segment module 605 as described above with reference to FIG. 6.

At block 1220, the device may communicate utilizing the configured first, second, and third resource segments as described above with reference to FIGS. 2-4. In certain examples, the operations of block 1220 may be performed by the communication management module 610 as described above with reference to FIG. 6.

Figure 13:
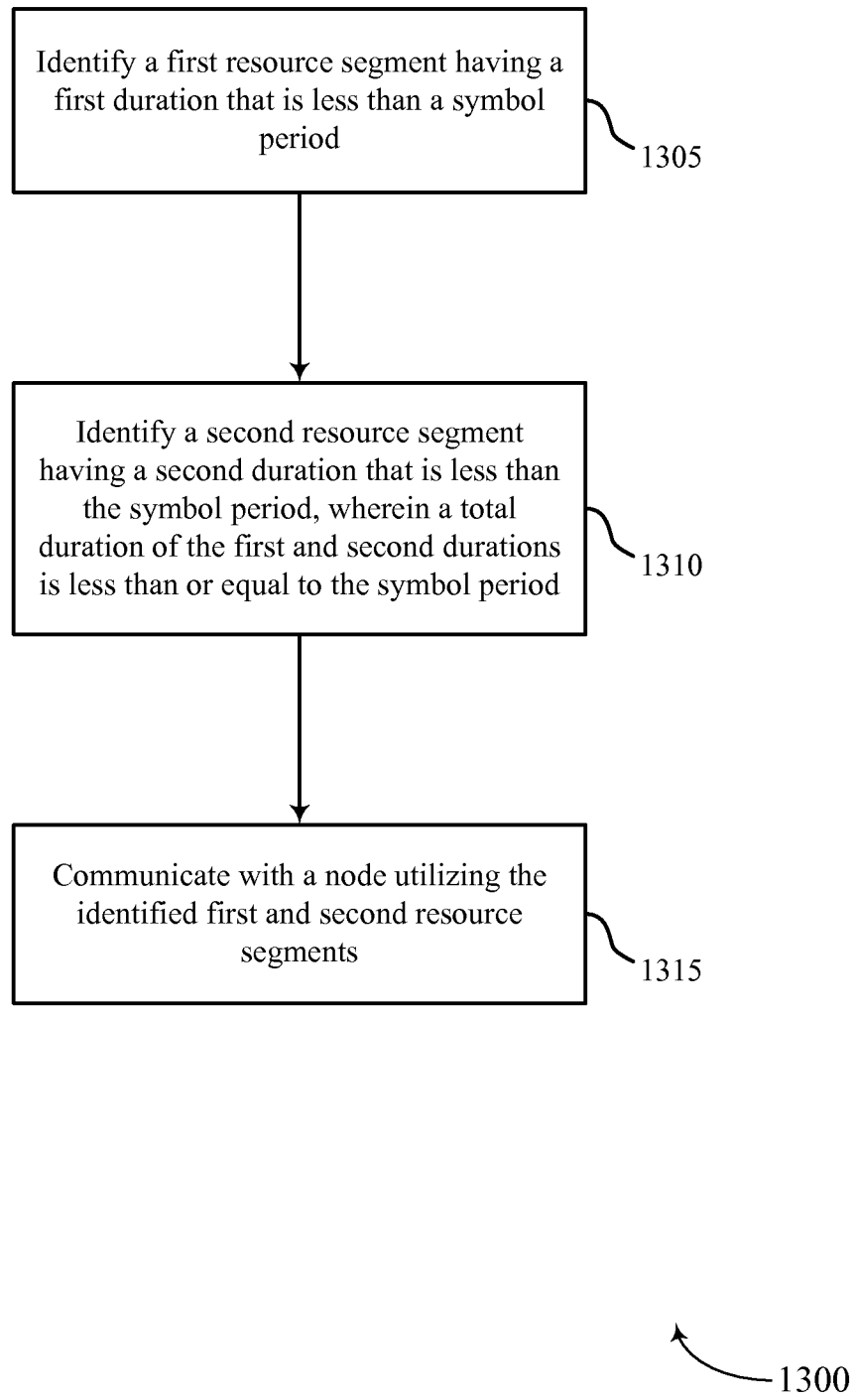
FIG. 13 shows a flowchart illustrating a method for nested system operation in accordance with various aspects of the present disclosure.

FIG. 13 shows a flowchart illustrating a method 1300 for wireless communication that supports nested system operation in accordance with various aspects of the present disclosure. The operations of method 1300 may be implemented by a UE 115, base station 105 or its components as described with reference to FIGS. 1-9. For example, the operations of method 1300 may be performed by the symbol adaptation module 510, symbol adaptation module 810, or base station symbol adaptation module 910, as described with reference to FIGS. 5-9. In some examples, a device (e.g., base station 105 or UE 115) may execute a set of codes to control the functional elements to perform the functions described below. Additionally or alternatively, the device may perform aspects the functions described below using special-purpose hardware. The method 1300 may also incorporate aspects of methods 1000, 1100, and 1200 of FIGS. 10-12.

At block 1305, the device may identify a first resource segment having a first duration that is less than a symbol period as described above with reference to FIGS. 2-4. In certain examples, the operations of block 1305 may be performed by the symbol segment module 605 as described above with reference to FIG. 6.

At block 1310, the device may identify a second resource segment having a second duration that is less than the symbol period, where a total duration of the first and second durations is less than or equal to the symbol period as described above with reference to FIGS. 2-4. In certain examples, the operations of block 1310 may be performed by the symbol segment module 605 as described above with reference to FIG. 6.

At block 1315, the device may communicate with a node utilizing the first and second resource segments as described above with reference to FIGS. 2-4. In certain examples, the operations of block 1315 may be performed by the communication management module 610 as described above with reference to FIG. 6.

Figure 14:
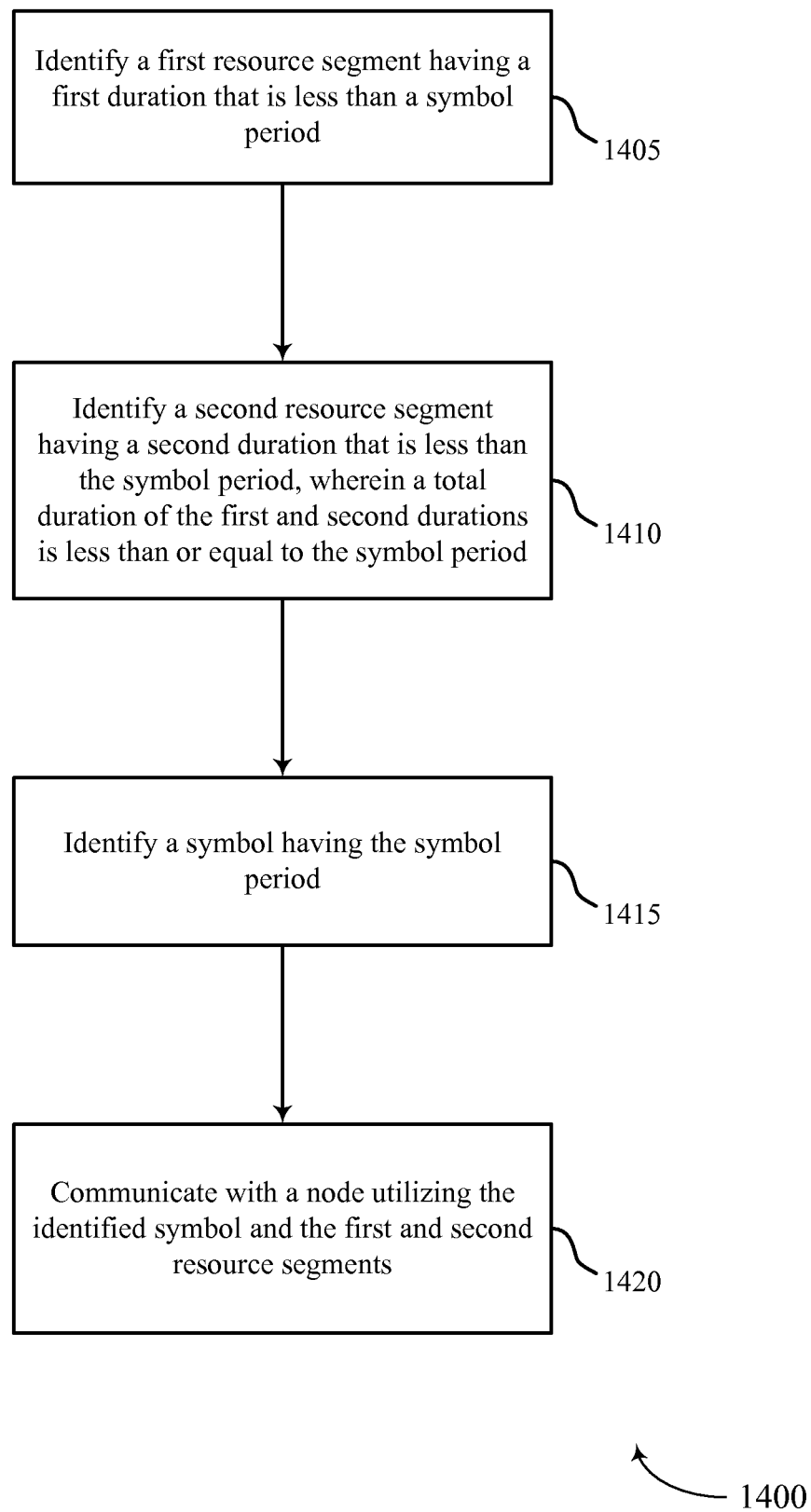
FIG. 14 shows a flowchart illustrating a method for nested system operation in accordance with various aspects of the present disclosure.

FIG. 14 shows a flowchart illustrating a method 1400 for wireless communication that supports nested system operation in accordance with various aspects of the present disclosure. The operations of method 1400 may be implemented by a UE 115, base station 105 or its components as described with reference to FIGS. 1-9. For example, the operations of method 1400 may be performed by the symbol adaptation module 510, symbol adaptation module 810, or base station symbol adaptation module 910, as described with reference to FIGS. 5-9. In some examples, a device (e.g., base station 105 or UE 115) may execute a set of codes to control the functional elements to perform the functions described below. Additionally or alternatively, the device may perform aspects the functions described below using special-purpose hardware. The method 1400 may also incorporate aspects of methods 1000, 1100, 1200, and 1300 of FIGS. 10-13.

At block 1405, the device may identify a first resource segment having a first duration that is less than a symbol period as described above with reference to FIGS. 2-4. In certain examples, the operations of block 1405 may be performed by the symbol segment module 605 as described above with reference to FIG. 6.

At block 1410, the device may identify a second resource segment having a second duration that is less than the symbol period, where a total duration of the first and second durations is less than or equal to the symbol period as described above with reference to FIGS. 2-4. In certain examples, the operations of block 1410 may be performed by the symbol segment module 605 as described above with reference to FIG. 6.

At block 1415, the device may identify a symbol having the symbol period as described above with reference to FIGS. 2-4. In certain examples, the operations of block 1415 may be performed by the symbol identification module 715 as described above with reference to FIG. 7.

At block 1420, the device may communicate with a node utilizing the symbol, first resource segment, second resource segment, or combination thereof as described above with reference to FIGS. 2-4. In certain examples, the operations of block 1420 may be performed by the communication management module 610 as described above with reference to FIG. 6. In some examples, the first and second resource segments include frequency resources of a first component carrier, and the device may receive grants for the frequency resources of the first component carrier on resources of a second component carrier. Additionally or alternatively, the device may transmit feedback related to the first or second resource segments on the frequency resources of the second component carrier.

Figure 15:
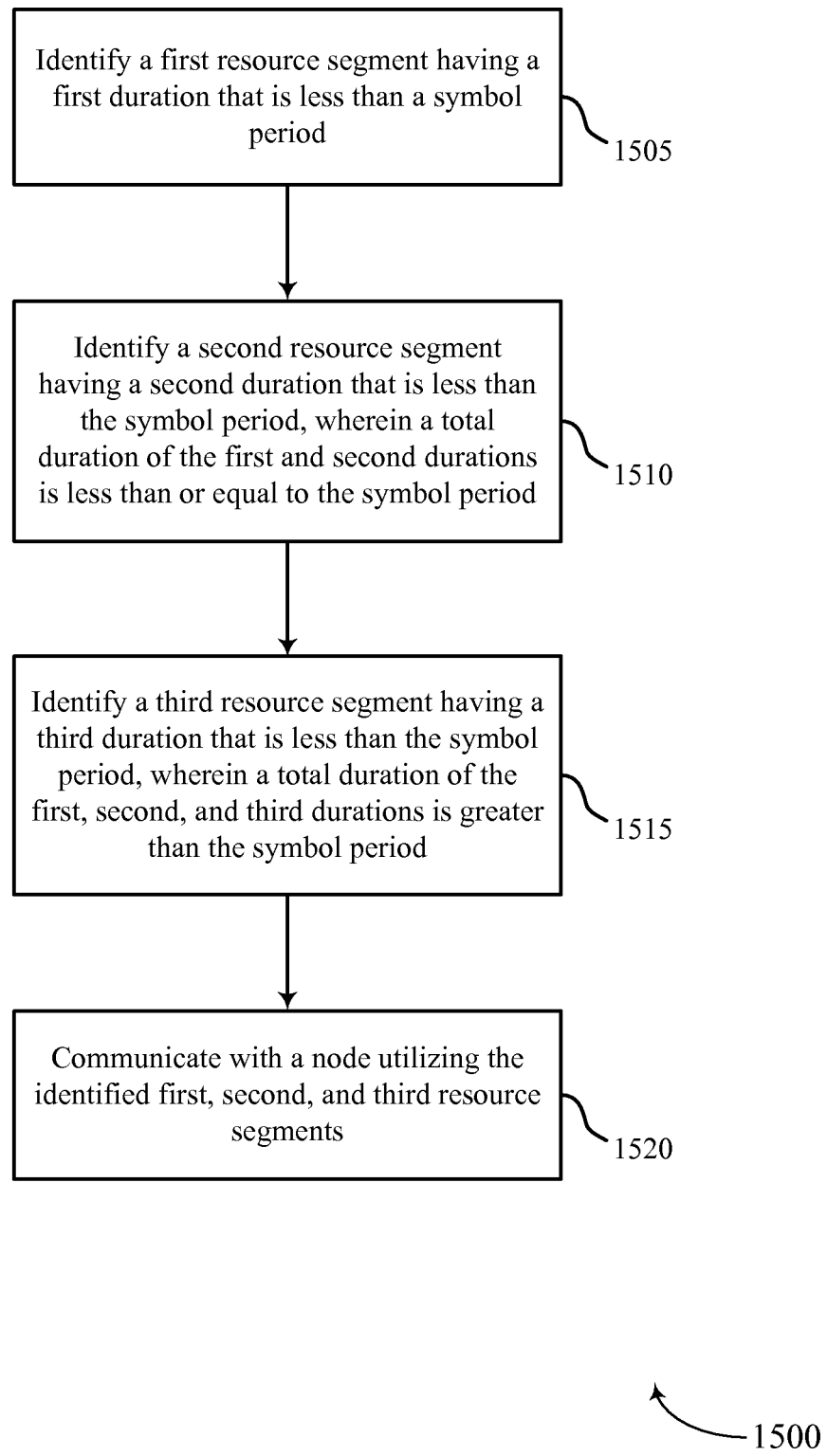
FIG. 15 shows a flowchart illustrating a method for nested system operation in accordance with various aspects of the present disclosure.

FIG. 15 shows a flowchart illustrating a method 1500 for wireless communication that supports nested system operation in accordance with various aspects of the present disclosure. The operations of method 1500 may be implemented by a UE 115, base station 105, or its components as described with reference to FIGS. 1-9. For example, the operations of method 1500 may be performed by the symbol adaptation module 510, symbol adaptation module 810, or base station symbol adaptation module 910, as described with reference to FIGS. 5-9. In some examples, a device (e.g., base station 105 or UE 115) may execute a set of codes to control the functional elements to perform the functions described below. Additionally or alternatively, the device may perform aspects the functions described below using special-purpose hardware. The method 1500 may also incorporate aspects of methods 1000, 1100, 1200, 1300, and 1400 of FIGS. 10-14.

At block 1505, the device may identify a first resource segment having a first duration that is less than a symbol period as described above with reference to FIGS. 2-4. In certain examples, the operations of block 1505 may be performed by the symbol segment module 605 as described above with reference to FIG. 6.

At block 1510, the device may identify a second resource segment having a second duration that is less than the symbol period, where a total duration of the first and second durations is less than or equal to the symbol period as described above with reference to FIGS. 2-4. In certain examples, the operations of block 1510 may be performed by the symbol segment module 605 as described above with reference to FIG. 6.

At block 1515, the device may identify a third resource segment having a third duration that is less than the symbol period, where a total duration of the first, second, and third durations is greater than the symbol period as described above with reference to FIGS. 2-4. In certain examples, the operations of block 1515 may be performed by the symbol segment module 605 as described above with reference to FIG. 6.

At block 1520, the device may communicate utilizing the first, second, and third resource segments as described above with reference to FIGS. 2-4. In certain examples, the operations of block 1520 may be performed by the communication management module 610 as described above with reference to FIG. 6.

Thus, methods 1000, 1100, 1200, 1300, 1400, and 1500 may provide for nested system operation. It should be noted that methods 1000, 1100, 1200, 1300, 1400, and 1500 describe possible implementation, and that the operations and the steps may be rearranged or otherwise modified such that other implementations are possible. In some examples, aspects from two or more of the methods 1000, 1100, 1200, 1300, 1400, and 1500 may be combined.

The detailed description set forth above in connection with the appended drawings describes example embodiments and does not represent all the embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   identifying, in a system that supports communications using a subframe comprising at least one subcarrier in a frequency domain and a plurality of symbol periods that are consecutive in a time domain, the subframe including at least one symbol having a symbol period of the plurality of symbol periods;
   identifying a first resource segment having a first symbol with a symbol period in the time domain that is less than the symbol period of the at least one symbol, wherein the first symbol comprises a first cyclic prefix (CP) having a duration different from a CP of the at least one symbol;
   identifying a second resource segment having a second symbol with a symbol period in the time domain that is less than the symbol period of the at least one symbol, wherein the second symbol comprises a second cyclic prefix (CP) having a duration different from the CP of the at least one symbol, wherein a total duration of the first and second symbol periods in the time domain is less than or equal to the symbol period of the at least one symbol; and
   communicating with a node utilizing the at least one symbol in the subframe and utilizing at least one of the first symbol of the first resource segment or the second symbol of the second resource segment.

2. The method of claim 1, wherein the second CP has a duration different from the first CP.

3. The method of claim 1, wherein communicating with the node comprises:
   receiving a control or data signal in the first resource segment, the second resource segment, and the at least one symbol having the symbol period, wherein the control or data signal spans the first and second symbol periods and the symbol period.

4. The method of claim 1, further comprising:
   identifying a third resource segment having a third symbol with a symbol period in the time domain that is less than the symbol period, wherein a total duration of the first, second, and third symbol periods in the time domain is greater than the symbol period; and
   communicating utilizing the first, second, and third resource segments.

5. The method of claim 4, wherein communicating with the node comprises:
   receiving a control or data signal in the first resource segment, the second resource segment, and the third resource segment, wherein the control or data signal spans the first, second, and third symbol periods.

6. The method of claim 1, wherein the first resource segment, the second resource segment, or a combination thereof comprises a demodulation reference signal (DMRS).

7. The method of claim 6, wherein the at least one symbol comprises a portion of the DMRS, the at least one symbol having the symbol period, and wherein the DMRS spans the first and second symbol periods and the symbol period.

8. The method of claim 1, wherein the first resource segment, the second resource segment, or a combination thereof comprises a common reference signal (CRS).

9. The method of claim 8, wherein the at least one symbol comprises a portion of the CRS, the symbol having the symbol period, and wherein the CRS spans the first and second symbol periods and the symbol period.

10. The method of claim 1, wherein the first resource segment, the second resource segment, or a combination thereof comprises a channel state information (CSI) reference signal.

11. The method of claim 10, wherein the at least one symbol comprises a portion of the CSI reference signal, the symbol having the symbol period, and wherein the CSI reference signal spans the first and second symbol periods and the symbol period.

12. An apparatus for wireless communication, comprising:
   means for identifying, in a system that supports communications using a subframe comprising at least one subcarrier in a frequency domain and a plurality of symbol periods that are consecutive in a time domain, the subframe including at least one symbol having a symbol period of the plurality of symbol periods;

means for identifying a first resource segment having a first symbol with a symbol period in the time domain that is less than the symbol period of the at least one symbol, wherein the first symbol comprises a first cyclic prefix (CP) having a duration different from a CP of the at least one symbol;

means for identifying a second resource segment having a second symbol with a symbol period in the time domain that is less than the symbol period of the at least one symbol, wherein the second symbol comprises a second cyclic prefix (CP) having a duration different from the CP of the at least one symbol, wherein a total duration of the first and second symbol periods in the time domain is less than or equal to the symbol period of the at least one symbol; and means for communicating with a node utilizing the at least one symbol in the subframe and at least one of utilizing the first symbol of the first resource segment or the second symbol of the second resource segment.

13. An apparatus for wireless communication, comprising:

a processor;

memory in electronic communication with the processor; and instructions stored in the memory, wherein the instructions are executable by the processor to cause the apparatus to:

identify, in a system that supports communications using a subframe comprising at least one subcarrier in a frequency domain and a plurality of symbol periods that are consecutive in a time domain, the subframe including at least one symbol having a symbol period of the plurality of symbol periods;

identify a first resource segment having a first symbol with a symbol period in the time domain that is less than the symbol period of the at least one symbol, wherein the first symbol comprises a first cyclic prefix (CP) having a duration different from a CP of the at least one symbol;

identify a second resource segment having a second symbol with a symbol period in the time domain that is less than the symbol period of the at least one symbol, wherein the second symbol comprises a second cyclic prefix (CP) having a duration different from the CP of the at least one symbol, wherein a total duration of the first and second symbol periods in the time domain is less than or equal to the symbol period of the at least one symbol; and communicate with a node utilizing the at least one symbol in the subframe and utilizing at least one of the first symbol of the first resource segment or the second symbol of the second resource segment.

14. The apparatus of claim 13, wherein the second CP has a duration different from the first CP.

15. The apparatus of claim 13, wherein to communicate with the node, the instructions are executable by the processor to cause the apparatus to:

receive a control or data signal in the first resource segment, the second resource segment, and the at least one symbol having the symbol period, wherein the control or data signal spans the first and second symbol periods and the symbol period.

16. The apparatus of claim 13, wherein the instructions are executable by the processor to cause the apparatus to:

identify a third resource segment having a third symbol with a symbol period in the time domain that is less than the symbol period, wherein a total duration of the first, second, and third symbol periods in the time domain is greater than the symbol period; and communicate utilizing the first, second, and third resource segments.

17. The apparatus of claim 16, wherein to communicate with the node, the instructions are executable by the processor to cause the apparatus to:

receive a control or data signal in the first resource segment, the second resource segment, and the third resource segment, wherein the control or data signal spans the first, second, and third symbol periods.

18. The apparatus of claim 13, wherein the first resource segment, the second resource segment, or a combination thereof comprises a demodulation reference signal (DMRS).

19. The apparatus of claim 18, wherein the at least one symbol comprises a portion of the DMRS, the symbol having the symbol period, and wherein the DMRS spans the first and second symbol periods and the symbol period.

20. The apparatus of claim 13, wherein the first resource segment, the second resource segment, or a combination thereof comprises a common reference signal (CRS).

21. The apparatus of claim 20, wherein the at least one symbol comprises a portion of the CRS, the symbol having the symbol period, and wherein the CRS spans the first and second symbol periods and the symbol period.

22. The apparatus of claim 13, wherein the first resource segment, the second resource segment, or a combination thereof comprises a channel state information (CSI) reference signal.

23. The apparatus of claim 22, wherein the at least one symbol comprises a portion of the CSI reference signal, the symbol having the symbol period, and wherein the CSI reference signal spans the first and second symbol periods and the symbol period.

24. A non-transitory computer-readable medium storing code for wireless communication, the code comprising instructions executable to:

identify, in a system that supports communications using a subframe comprising at least one subcarrier in a frequency domain and a plurality of symbol periods that are consecutive in a time domain, the subframe including at least one symbol having a symbol period of the plurality of symbol periods;

identify a first resource segment having a first symbol with a symbol period in the time domain that is less than the symbol period of the at least one symbol, wherein the first symbol comprises a first cyclic prefix (CP) having a duration different from a CP of the at least one symbol;

identify a second resource segment having a second symbol with a symbol period in the time domain that is less than the symbol period of the at least one symbol, wherein the second symbol comprises a second cyclic prefix (CP) having a duration different from the CP of the at least one symbol, wherein a total duration of the first and second symbol periods in the time domain is less than or equal to the symbol period of the at least one symbol; and communicate with a node utilizing the at least one symbol in the subframe and utilizing at least one of the first symbol of the first resource segment or the second symbol of the second resource segment.

25. A method for wireless communication, comprising:
- identifying, in a system that supports communications using a subframe comprising at least one subcarrier in a frequency domain and a plurality of symbol periods that are consecutive in a time domain, a first resource segment in the subframe, wherein the first resource segment has a first duration in the time domain that is less than a symbol period of a symbol and has a first cyclic prefix (CP);
- identifying, in the subframe, a second resource segment having a second duration in the time domain that is less than the symbol period and has a second CP, wherein a total duration of the first and second durations in the time domain is less than or equal to the symbol period; and
- communicating with a node utilizing the first resource segment or the second resource segment, wherein at least one of the first CP or the second CP has a duration different from a CP of the symbol having the symbol period.

* * * * *